US006774588B2

(12) United States Patent
Ibuki et al.

(10) Patent No.: US 6,774,588 B2
(45) Date of Patent: Aug. 10, 2004

(54) CONTROLLING APPARATUS FOR LINEAR OSCILLATION MOTOR AND METHOD FOR CONTROLLING LINEAR OSCILLATION MOTOR

(75) Inventors: Yasuo Ibuki, Hikone (JP); Atsushi Takahashi, Nagaokakyo (JP); Takio Maekawa, Hikone (JP); Mikihiro Yamasita, Echi-gun (JP)

(73) Assignee: Matsushita Electric Works, Ltd., Kadoma (JP)

( * ) Notice: Subject to any disclaimer, the term of this patent is extended or adjusted under 35 U.S.C. 154(b) by 29 days.

(21) Appl. No.: 10/054,846

(22) Filed: Jan. 25, 2002

(65) Prior Publication Data

US 2002/0101125 A1 Aug. 1, 2002

(30) Foreign Application Priority Data

| Jan. 26, 2001 | (JP) | ................................ 2001-017936 |
| Nov. 27, 2001 | (JP) | ................................ 2001-361720 |

(51) Int. Cl.$^7$ ............................................. H02K 33/10
(52) U.S. Cl. ........................ 318/119; 310/20; 310/80; 318/128; 318/127; 318/135
(58) Field of Search ............................ 310/12–14, 20, 310/80; 318/119, 121, 126–129, 135, 138, 439

(56) References Cited

U.S. PATENT DOCUMENTS

| 1,672,221 A | * | 6/1928 | Karcevsk | ..................... 310/80 |
| 3,584,496 A | * | 6/1971 | Keller | ........................ 72/430 |
| 4,228,373 A | * | 10/1980 | Funderburg | .................. 310/20 |
| 5,280,163 A | * | 1/1994 | Barkan | .................. 235/462.36 |
| 5,869,944 A | * | 2/1999 | Tanina | ........................ 318/599 |
| 5,955,799 A | * | 9/1999 | Amaya et al. | ................ 310/36 |
| 6,348,773 B1 | * | 2/2002 | Dvorkis et al. | ............. 318/685 |

FOREIGN PATENT DOCUMENTS

| JP | 56-060313 A | * | 5/1981 |
| JP | 08-331826 | | 12/1996 |
| JP | 10-243622 | | 9/1998 |
| JP | 2001-16892 | | 1/2001 |
| WO | WO 00/38891 | | 7/2000 |

* cited by examiner

*Primary Examiner*—Dang Le
*Assistant Examiner*—Judson H. Jones
(74) *Attorney, Agent, or Firm*—Oblon, Spivak, McClelland, Maier & Neustadt, P.C.

(57) ABSTRACT

A controlling apparatus for controlling a linear oscillation motor includes a sensor and a controller. The motor has a movable element and a stator one of which includes an electromagnet with a winding. The sensor is configured to detect movement of the movable element. The controller is configured to intermittently supply electric power to the winding of the electromagnet to move the movable element reciprocally and linearly. The controller is configured to begin each intermittent supply of electric power to the winding at a timing before a dead center of the movable element based on an output of the sensor.

25 Claims, 22 Drawing Sheets

Figure 2(a) POSITION

Figure 2(b) CURRENT

Figure 3(a) POSITION

Figure 3(b) CURRENT

Figure 7(a) POSITION

Figure 7(b) INDUCED VOLTAGE

Figure 7(c) CURRENT

Figure 8(a) POSITION

Figure 8(b) INDUCED VOLTAGE

Figure 8(c) CURRENT

Figure 18(a) POSITION

Figure 18(b) CURRENT

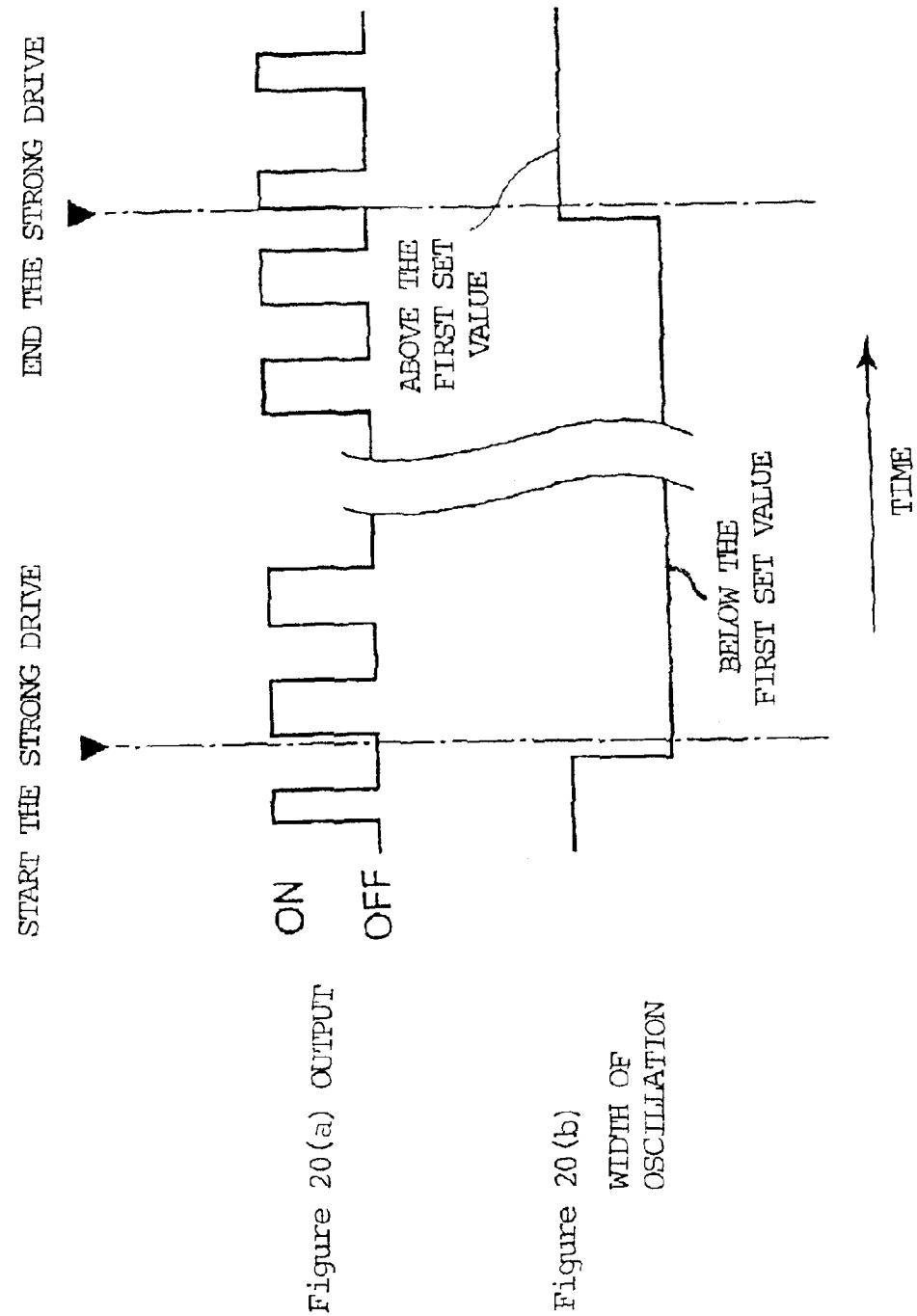

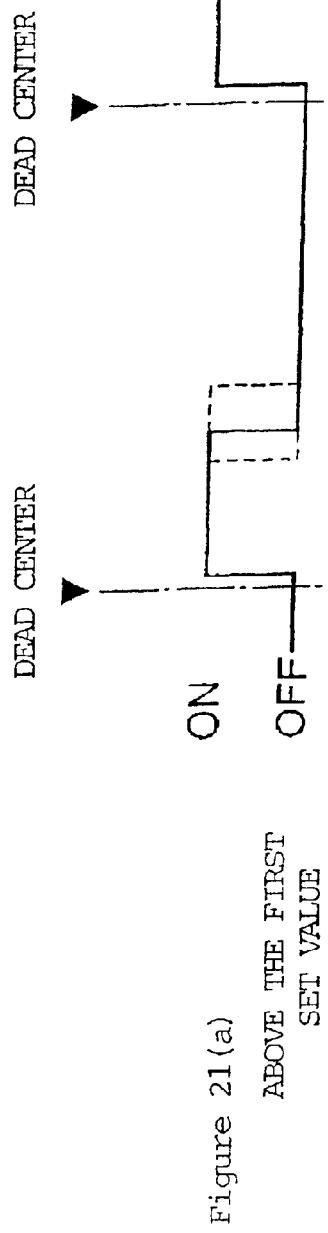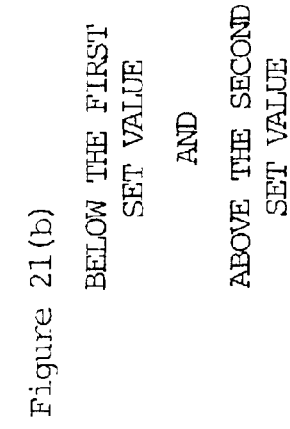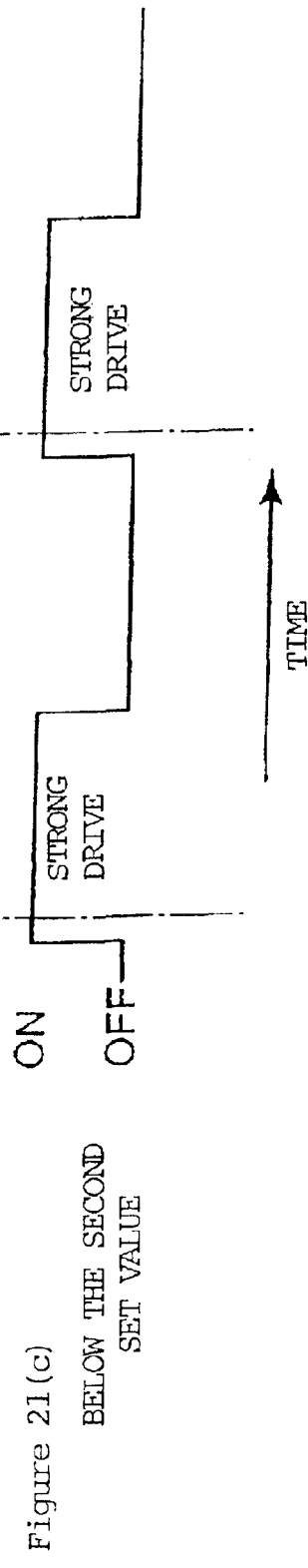
Figure 21(a) ABOVE THE FIRST SET VALUE
Figure 21(b) BELOW THE FIRST SET VALUE AND ABOVE THE SECOND SET VALUE
Figure 21(c) BELOW THE SECOND SET VALUE

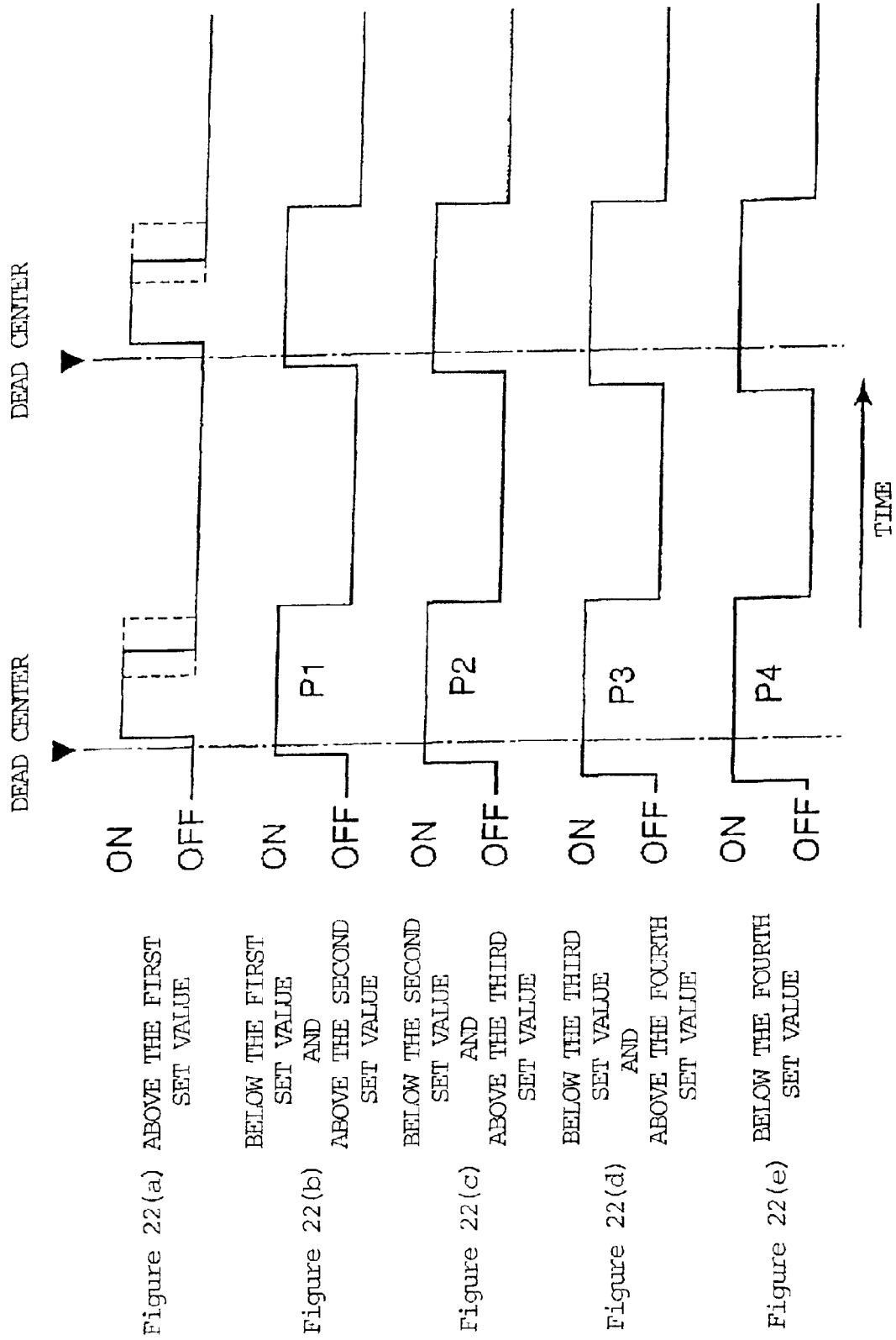

CONTROLLING APPARATUS FOR LINEAR OSCILLATION MOTOR AND METHOD FOR CONTROLLING LINEAR OSCILLATION MOTOR

CROSS-REFERENCE TO RELATED APPLICATIONS

The present application claims priority to Japanese Patent Application No. 2001-017936, filed Jan. 26, 2001, and Japanese Patent Application No. 2001-361720, filed Nov. 27, 2001. The contents of those applications are incorporated herein by reference in their entirety.

BACKGROUND OF THE INVENTION

1. Field of the Invention

The present invention relates to a linear oscillation motor, a controlling apparatus for a linear oscillation motor and a method for controlling a linear oscillation motor.

2. Discussion of the Background

Japanese Unexamined Patent Publication 8-331826 discloses a method for controlling a linear oscillation motor in which a controlling apparatus supplies current compatible to the moving direction of a movable element in the linear oscillation motor as a detector detects the moving direction of the movable element. In other words, this controlling device begins current supply somewhere between the point where the movable element reverses its moving direction and the mid-point of the oscillatory movement. Thus, the oscillatory movement of the movable element is not interfered by the operation of the controlling apparatus.

Also, Japanese Unexamined Patent Publication 10-243622 discloses a method for controlling a linear oscillation motor in which a controlling apparatus drives a movable element of the linear oscillation motor according to a fixed frequency when the movement of the movable element cannot be detected. According to Japanese Unexamined Patent Publication 10-243622, a frequency detected while the movement of the movable element can be detected is utilized for the fixed frequency.

Furthermore, Japanese Unexamined Patent Publication 2001-16892 discloses a method for controlling a linear oscillation motor in which movement of a movable element of the linear oscillation motor, such as position, velocity and/or acceleration, is determined by detecting voltage induced in a winding of an electromagnet in the linear oscillation motor. According to Japanese Unexamined Patent Publication 2001-16892, since only the voltage induced due to the movement of the movable element is detected, a period during which current supply to the winding is cut off is set up in a duration during which the movable element is expected to reverse its moving direction.

The contents of those publications are incorporated herein by reference in their entirety.

SUMMARY OF THE INVENTION

According to one aspect of the present invention, a controlling apparatus for controlling a linear oscillation motor includes a sensor and a controller. The motor has a movable element and a stator one of which includes an electromagnet with a winding. The sensor is configured to detect movement of the movable element. The controller is configured to intermittently supply electric power to the winding of the electromagnet to move the movable element reciprocally and linearly. The controller is configured to begin each intermittent supply of electric power to the winding at a timing before a dead center of the movable element based on an output of the sensor.

According to another aspect of the present invention, a linear oscillation motor includes a movable element, a stator, one of the movable element and the stator comprising an electromagnet with a winding, a sensor configured to detect movement of the movable element, and a controller configured to intermittently supply electric power to the winding of the electromagnet to move the movable element reciprocally and linearly, the controller being configured to begin each intermittent supply of electric power to the winding at a timing before a dead center of the movable element based on an output of the sensor.

According to another aspect of the present invention, a linear oscillation motor includes a rotor, a stator, one of the rotor and the stator comprising an electromagnet with a winding, a sensor configured to detect movement of the movable element, a controller configured to intermittently supply electric power to the winding of the electromagnet to rotate the rotor periodically changing a rotational direction of the rotor, the controller being configured to begin each intermittent supply of electric power to the winding at a timing before a dead center at which the rotor changes its rotational direction, and an oscillatory element configured to be moved reciprocally and linearly by rotation of the rotor.

According to yet another aspect of the present invention, a method for controlling a linear oscillation motor having a movable element and a stator one of which comprises an electromagnet with a winding, includes detecting movement of the movable element, supplying electric power intermittently to the winding of the electromagnet to move the movable element reciprocally and linearly, and beginning each intermittent supply of electric power to the winding at a timing before a dead center of the movable element based on an output of the sensor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 20(a) is an exemplary graph showing a timing chart of a controlling device according to one alternative of the fifth embodiment;

FIG. 20(b) is an exemplary graph showing a width of the linear oscillation relative to FIG. 20(a);

FIG. 21(a) is an exemplary graph showing a timing chart of a controlling device according to another alternative of the fifth embodiment;

FIG. 21(b) is an exemplary graph showing another timing chart of the controlling device related to FIG. 21(a);

FIG. 21(c) is an exemplary graph showing yet another timing chart of the controlling device related to FIG. 21(a);

FIG. 22(a) is an exemplary graph showing a timing chart of a controlling device according to yet another alternative of the fifth embodiment;

FIG. 22(b) is an exemplary graph showing another timing chart of the controlling device related to FIG. 22(a);

FIG. 22(b) is an exemplary graph showing yet another timing chart of the controlling device related to FIG. 22(a);

FIG. 22(c) is an exemplary graph showing still another timing chart of the controlling device related to FIG. 22(a);

FIG. 22(d) is an exemplary graph showing still another timing chart of the controlling device related to FIG. 22(a);

FIG. 22(e) is an exemplary graph showing still another timing chart of the controlling device related to FIG. 22(a);

DESCRIPTION OF THE EMBODIMENTS

Figure 1:
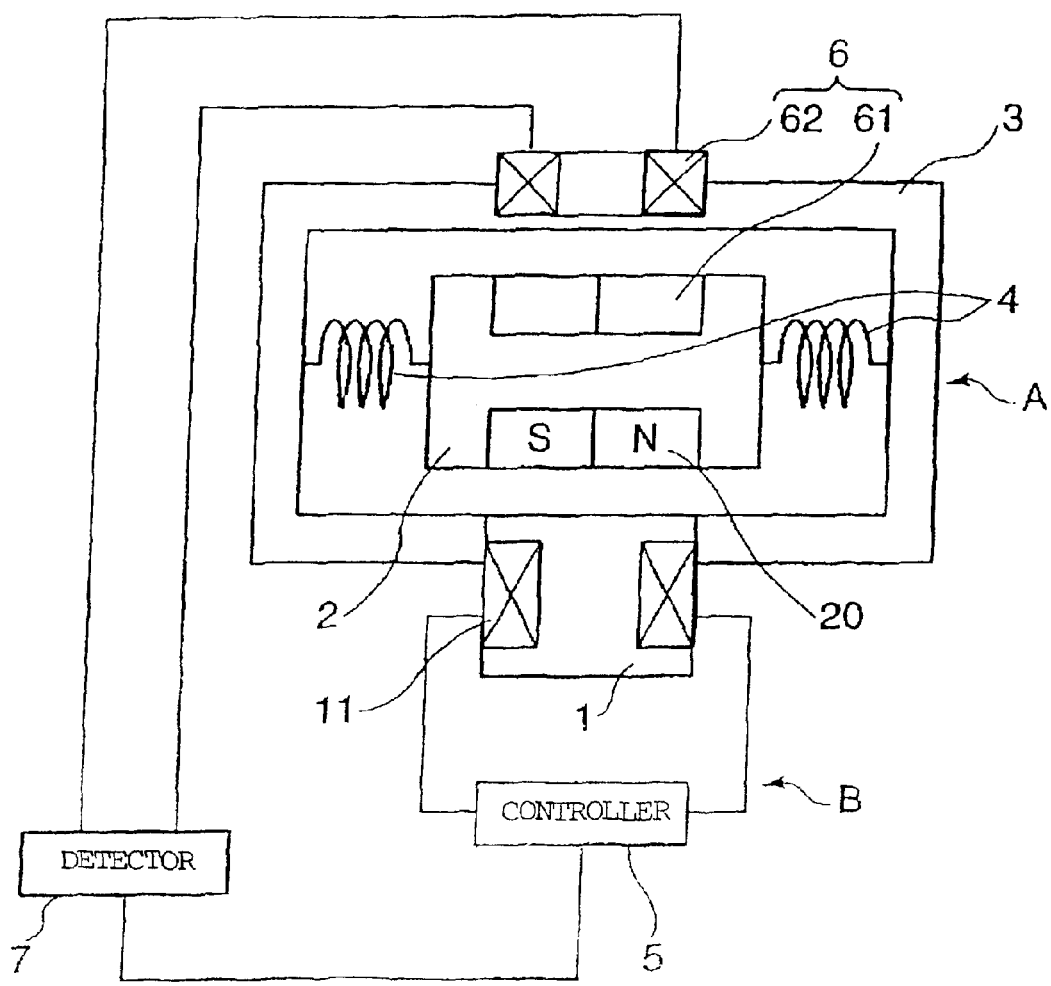
FIG. 1 is an exemplary schematic diagram showing a linear oscillation motor and a controlling device for controlling the linear oscillation motor of the first embodiment according to the present invention.

The embodiments will now be described with reference to the accompanying drawings, wherein like reference numerals designate corresponding or identical elements throughout the various drawings.

FIG. 1 is an exemplary schematic diagram showing a linear oscillation motor and a controlling device for controlling the linear oscillation motor of the first embodiment according to the present invention. Referring to FIG. 1, a linear oscillation motor (A) includes a stator 1 and a movable element 2 provided in a frame 3. The stator 1 has an electromagnet 11, and is fixedly provided in the frame 3. The electromagnet 11 includes a winding. Voltage having, for example, square wave is supplied to the winding. The movable element 2 includes a permanent magnet 20 having an S pole and an N pole, and is movably provided via elastic elements, for example, coil springs, in the frame 3 such that the movable element 2 oscillates side to side with respect to the stator 1. A controlling apparatus (B) for controlling the linear oscillation motor (A) includes a controller 5, a sensor 6, and a detector 7. The controller 5 controls current supply to the electromagnet 11. The senor 6 includes a winding (coil) 62 fixed in the frame 3 and a sensing magnet 61 provided in the movable element 2 for sensing position, velocity and/or acceleration of the movable element 2. The sensing magnet 61 has magnetic poles aligned in the direction of the linear oscillation of the movable element 2. The detector 7 receives and converts signals from the sensor 6 to position, velocity and/or acceleration of the movable element 2.

The electromagnet 11 of the stator 1 alternates between N and S poles depending on the current from the controller 5. As the movable element 2 linearly oscillates, the magnetic flux of the sensing magnet 61 crosses the coil 62 and induces current or voltage in the coil 62. Then, the detector 7 receives the induced current or voltage, and detects position, velocity and/or acceleration of the movable element 2. Thus, based on the position, velocity and/or acceleration, the controller 5 controls the timing, pulse, and direction of the current to the electromagnet 11. By controlling the magnetization of the electromagnet 11 as such, magnetic attraction and repulsion are created between the electromagnet 11 and the permanent magnet 20, thereby oscillating the movable element 2 linearly with respect to the stator 1. Namely, the controller 5 is configured to intermittently supply electric power to the winding of the electromagnet 11 to move the movable element 2 reciprocally and linearly.

As the elastic elements are connecting the movable element 2 to the frame 3 and urging the movable element 2 to its original position, the linear oscillation motor (A) of this embodiment has a mechanical resonant frequency determined based on the weight of the movable element 2 and the spring modulus, i.e., force constant, of the elastic elements. The controller 5 supplies a current having the same frequency as the mechanical resonant frequency, thereby making the movable element 2 oscillate more efficiently.

Current or voltage induced in the sensor 6 changes depending on the magnitude, velocity and direction of oscillation as well as the position of the movable element 2. In particular, when the movable element 2 reaches the maximum displacement of oscillation, the sensing magnet 61 is not moving, and thus there is no change in the magnetic flux of the sensing magnet 61 with respect to the coil 62, making the current or voltage induced in the sensor 6 zero. On the other hand, when the movable element 2 is at the mid point of oscillation, i.e., the mid point of the width of the linear oscillation, the sensing magnet 61 reaches its maximum velocity, and thus there is the maximum change in the magnetic flux of the sensing magnet 61 with respect to the coil 62, making the current or voltage induced in the sensor 6 maximum. In other words, when the movable element 2 moving in one direction is at the mid point of oscillation, the current or voltage induced in the sensor 6 is the maximum, i.e., the current or voltage amplitude. Also, when the movable element 2 moving in the opposite direction is at the mid point of oscillation, the current or voltage induced in the sensor 6 is the minimum, i.e., the current or voltage amplitude, as well. Thus, by detecting a timing which the current or voltage induced in the sensor 6 becomes maximum, a timing of the maximum velocity of the moving element 2 can be determined. Also, because the zero points, i.e., where the current or voltage induced in the sensor 6 becomes zero, are the positions where the movable element 2 reverses its direction of oscillatory movement, the direction of the movable element 2 can be determined from the polarity of that current or voltage. The zero points are "dead center." By using a magnet whose N-S poles are arranged side by side for the sensing magnet 61, signals having opposite polarities can be detected as the movable element 2 oscillates in opposite directions, respectively.

In the first embodiment, the sensor 6 utilizes the sensing magnet 61 and coil 62 capable of determining the direction, position and reversing points of the movable element 2 and determines velocity and acceleration of the movable element 2 based on the current or voltage induced in the sensor 6. Alternatively, velocity of the movable element 2 may be determined based on a time interval at which the current or voltage induced in the sensor 6 becomes zero. Since the points where the movable element 2 reverses its direction can be determined precisely without being influenced by inconsistencies in a magnetic force of the sensing magnet 61 or a distance between the sensing magnet 61 and coil 62, velocity of the movable element 2 is determined more accurately based on such a time interval.

Figure 2:
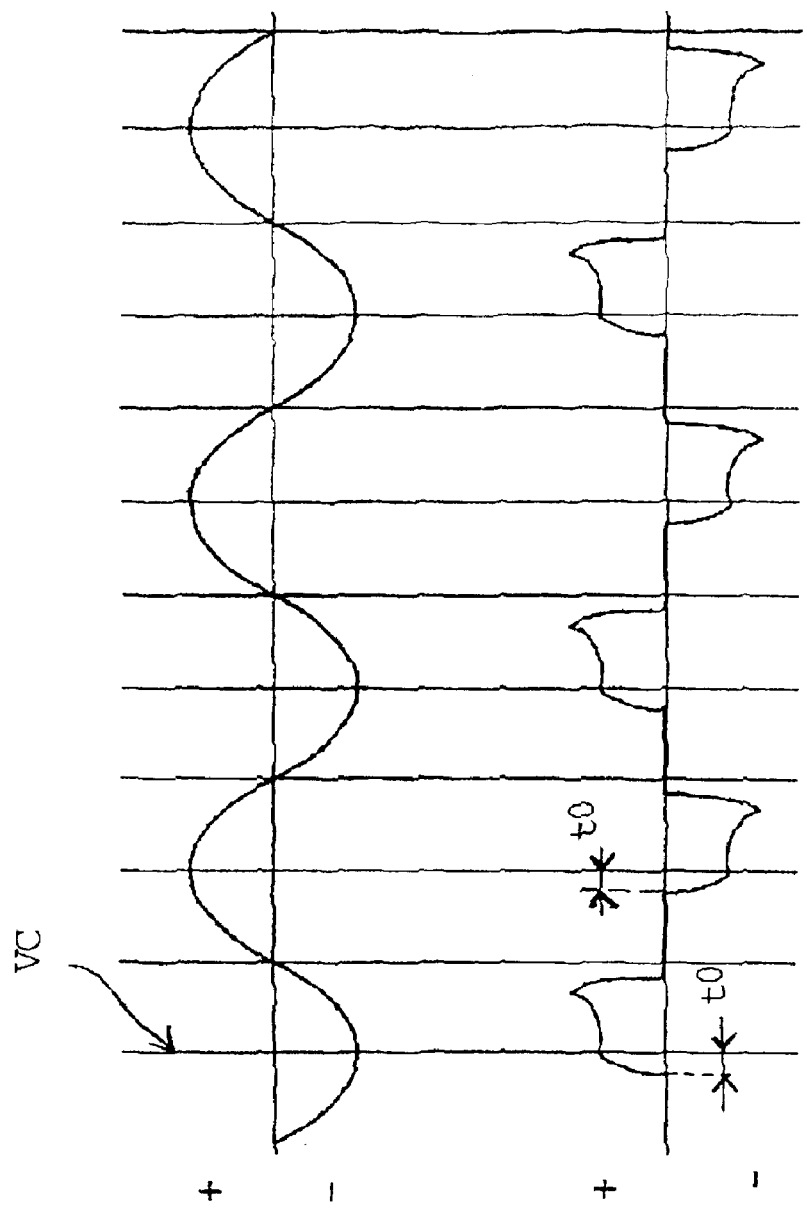
FIG. 2(a) is an exemplary graph showing the position of a movable element according to the first embodiment.
FIG. 2(b) is an exemplary graph showing current supplied to an electromagnet relative to FIG. 2(a)

FIG. 2(*a*) is an exemplary graph showing the position of the movable element 2. FIG. 2(*b*) is an exemplary graph showing current supplied to the electromagnet 11 relative to FIG. 2(*a*). Specifically, FIG. 2(*a*) shows shifting of the position of the movable element 2, and FIG. 2(*b*) shows current supplied to the electromagnet 11 in relation to the position of the movable element 2. Referring to FIG. 2(*a*), the movable element 2 of the linear oscillation motor (A) oscillates right and left in FIG. 1 in time. Thus, FIG. 2(*a*) has vertical coordinates for positions and a horizontal coordinate for time, and shows a sine wave. In FIG. 2(*a*), when the movable element 2 oscillates in the (+) direction and the (−) direction, for example, toward right and toward left, respectively, there is a timing (the dead center) which the movable element 2 changes its moving direction. For example, the vertical coordinate (VC) in FIG. 2(*a*) indicates such a timing. According to the first embodiment of the present invention, the supply of current begins at a timing (t0) prior to the dead center. Namely, the controller 5 is configured to intermittently supply electric power to the winding of the electromagnet 11 to move the movable element 2 reciprocally and linearly. The controller 5 is configured to begin each intermittent supply of electric power to the winding at the timing (t0) before a dead center (VC) of the movable element based on an output of the sensor. For example, when the duration of electric power supply during half cycle of the movement of the moving element 2 is 1.8 ms, the timing (t0) is 0.2 ms (a preset period) before the dead center. Preferably, the preset period is shorter than ¼ of a cycle of the linear oscillation by the movable element 2.

During the linear oscillation of the movable element 2, electromagnetic force influencing the movable element 2 changes depending on the strength of the electromagnet 11 in the stator 1. Also, a timing which the movable element 2 receives the electromagnetic force changes the efficiency of the linear oscillation. Hence, by increasing current to the electromagnet 11, i.e., increasing the electromagnetic force emanating from the electromagnet 11, at a timing efficiently synchronized with the oscillatory movement of the movable element 2, the oscillation of the movable element 2 can be made larger more effectively. For example, to the movable element 2 oscillating in a sine wave, it is efficient to apply electromagnetic force between the maximum displacement point, i.e., where the movable element 2 reverses its direction of movement, and the mid point, i.e., where the movable element 2 reaches its maximum velocity. Accordingly, the supply of current begins prior to the point where the movable element 2 reverses its direction of movement such that the current is gradually increased between the maximum displacement point and the mid point.

Figure 8:
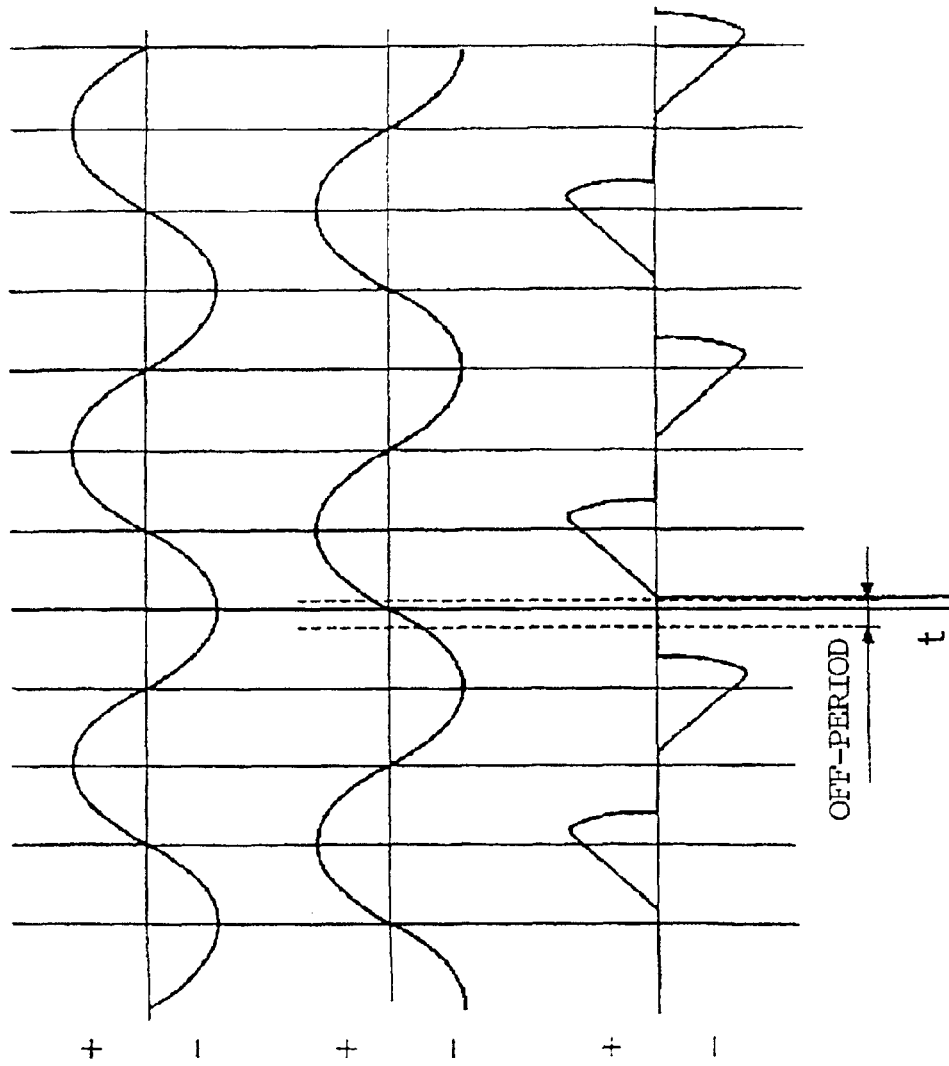
FIG. 8(a) is a graph showing the position of a movable element according to a background art.
FIG. 8(b) is a graph showing voltage induced in the coil of an electromagnet relative to FIG. 8(a)
FIG. 8(c) is a graph showing current supplied to the electromagnet relative to FIG. 8(a)

On the contrary, if the supply of a current begins after the point where the movable element 2 reverses its direction of movement, the current does not take effect on the electromagnet 11 immediately due to the inductance of the electromagnet 11, e.g., the inductance of the winding. Thus, as shown in FIG. 8(c), the current appears in a jagged wave form. However, if the supply of current begins prior to the dead center, i.e., the point where the movable element 2 reverses its direction of movement, because of electromagnetic inductance caused by the decrease in the magnetic flux of the permanent magnet 20 in the movable element 2, the current takes effect on the electromagnet 11 immediately as shown in FIG. 2. As a result, the magnetic force of the electromagnet 11 increases immediately. Although the movement of the movable element 2 is slightly interfered by the magnetic force of the electromagnet 11 increased in the direction opposite to the movement of the movable element 2, by increasing the magnetic force of the electromagnet 11 as such, the linear motor (A) is controlled more efficiently on balance.

Figure 3:
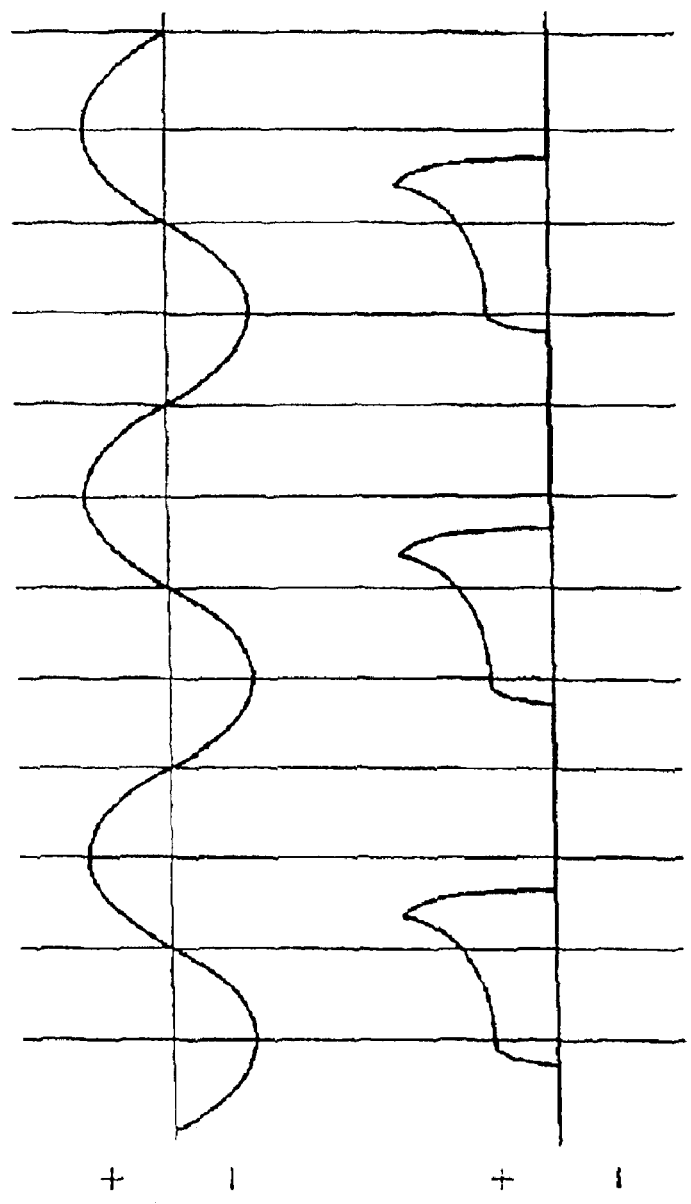
FIG. 3(a) is another exemplary graph showing the position of the movable element according to the first embodiment.
FIG. 3(b) is another exemplary graph showing current supplied to the electromagnet relative to FIG. 3(a)

FIG. 3(a) is an exemplary graph showing the position of the movable element 2, and FIG. 3(b) is an exemplary graph showing current supplied to the electromagnet 11. As shown in FIGS. 3(a) and 3(b), the controller 5 of the first embodiment may supply current only in one direction to drive the linear oscillation motor (A).

Figure 4:
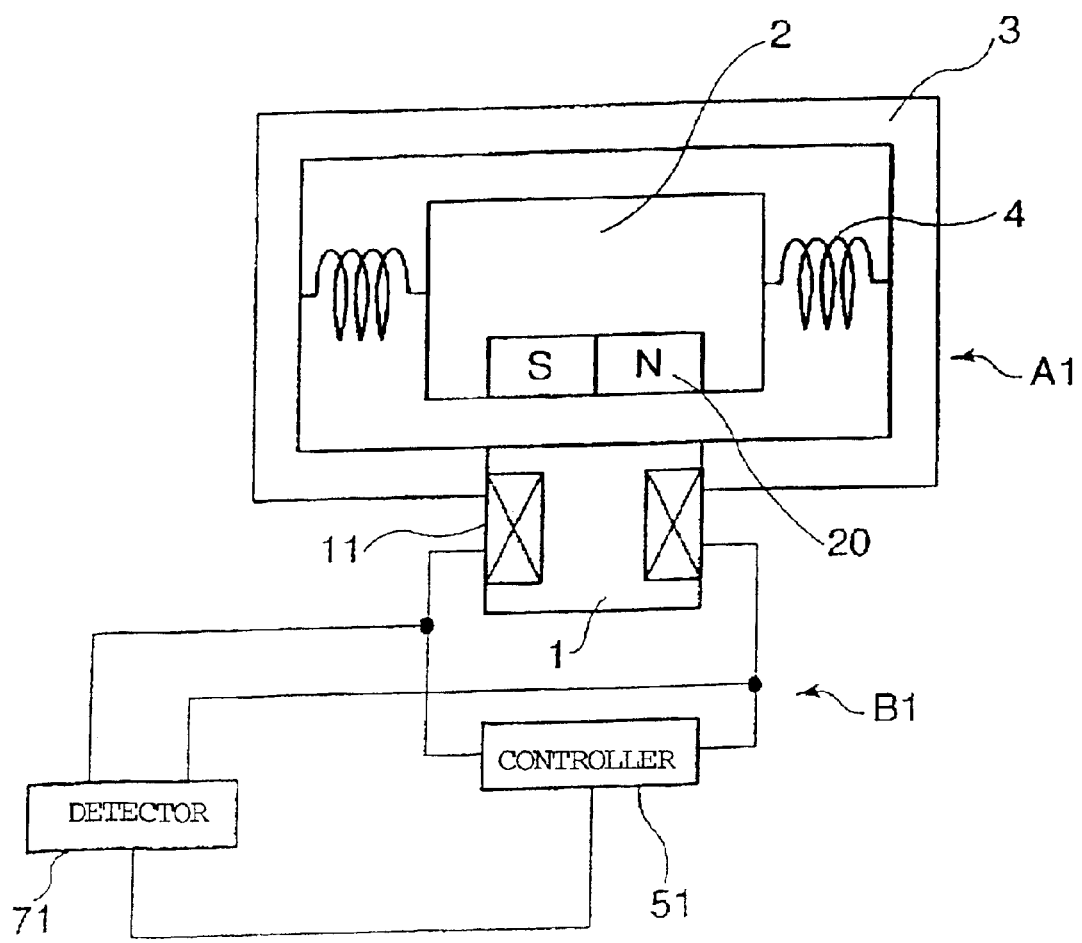
FIG. 4 is an exemplary schematic diagram showing a linear oscillation motor and a controlling device for controlling the linear oscillation motor of the second and third embodiments according to the present invention.

FIG. 4 is an exemplary schematic diagram showing a linear oscillation motor of the second and third embodiments according to the present invention. In the second embodiment, variables related to the oscillatory movement of a linear motor (A1), such as position, velocity and acceleration of a movable element 2, are determined based on voltage induced in a motor coil. Referring to FIG. 4, a controlling apparatus (B1) includes a detector 71 and a controller 51. The detector 71 of the second and third embodiments detects position, velocity and/or acceleration of the movable element 2 based on voltage induced in the winding of an electromagnet 11. The controller 51 controls current supply to the electromagnet 11 in the movable element 2.

In the second embodiment, because the detector 71 cannot make an accurate detection while current is being supplied to the electromagnet 11, the controller establishes off-periods during which the current supply to the electromagnet is shut off, and the detector 71 carries out detections during the off-periods.

Figure 5:
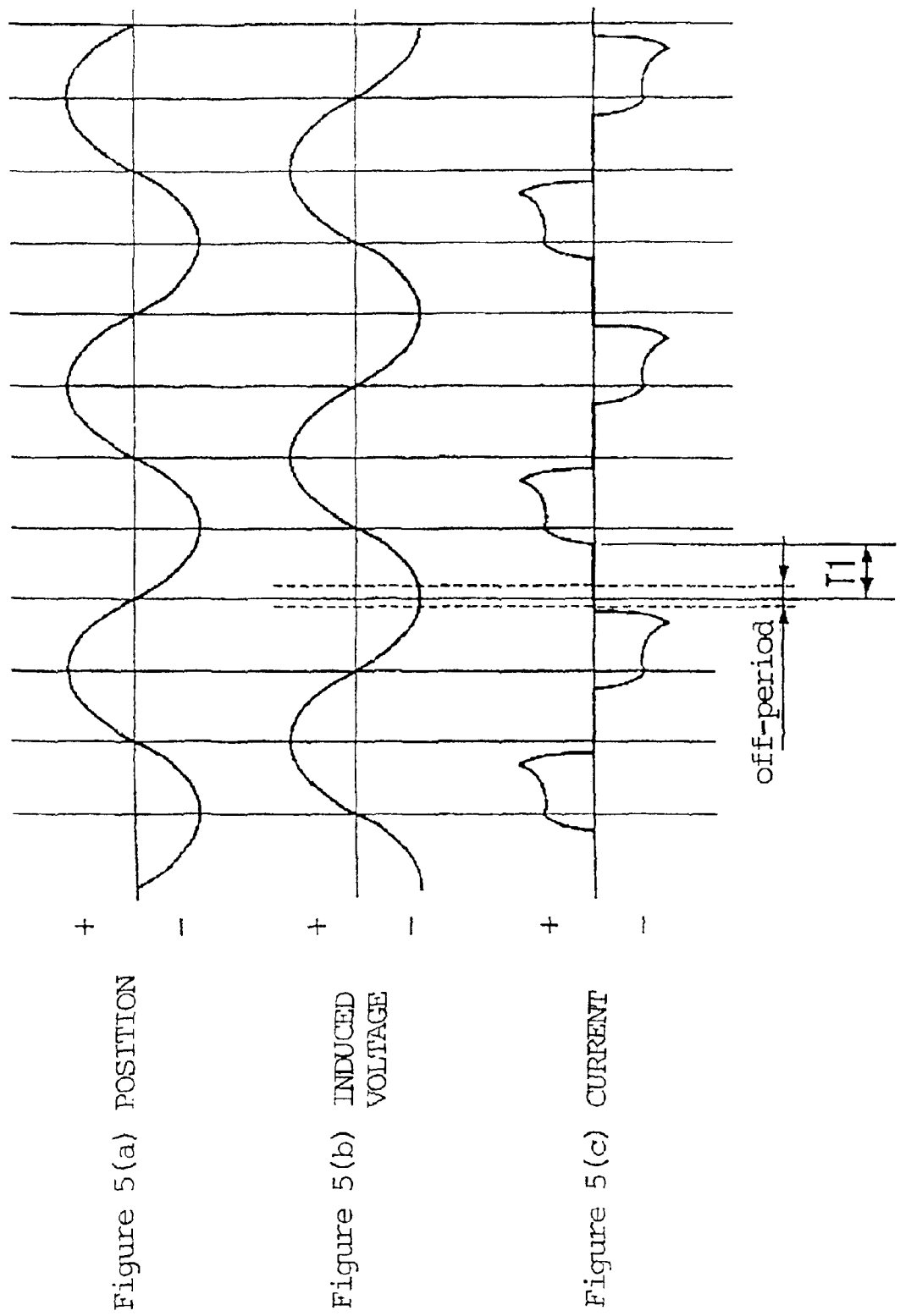
FIG. 5(a) is an exemplary graph showing the position of a movable element according to the second embodiment.
FIG. 5(b) is an exemplary graph showing voltage induced in the coil of an electromagnet relative to FIG. 5(a)
FIG. 5(c) is an exemplary graph showing current supplied to the electromagnet relative to FIG. 5(a)

FIG. 5(a) is an exemplary graph showing the position of the movable element 2, FIG. 5(b) is an exemplary graph showing voltage induced in the winding of the electromagnet 11 relative to FIG. 5(a), and FIG. 5(c) is an exemplary graph showing current supplied to the electromagnet 11 relative to FIG. 5(a). Referring to FIGS. 5(a)–5(c), the off-periods are set up around and over the timing during which the position of the movable element 2 is at the center of its linear oscillation, i.e., change in the position of the movable element is zero. During those times, the velocity of the movable element 2 reaches maximum, and thus the voltage induced in the winding of the electromagnet 11 becomes maximum. Therefore, the controller 5 of the second embodiment begins to supply current to the electromagnet 11 after a preset period (T1) from the times when the voltage induced in the winding of the electromagnet 11 becomes maximum.

The detector 71 detects the maximum voltage induced in the winding of the electromagnet 11, for example, by repeating measurements of the voltage being induced in the coil by a small increment and determining the points where the difference between a voltage and the voltage measured immediately before that changes its tendency. Also, to measure time, a timer may be provided internally. By setting the preset period (T1) shorter than ¼ of a cycle of the linear oscillation by the movable element 2, the supply of current can begin before the movable element reverses its direction in the linear oscillation.

Furthermore, in the third embodiment, the detector 71 detects points in which the voltage induced in the winding of the electromagnet 11 exceeds a predetermined voltage value (V0), and the controller begins to supply current to the electromagnet after a set period (T2) from those points.

Figure 6:
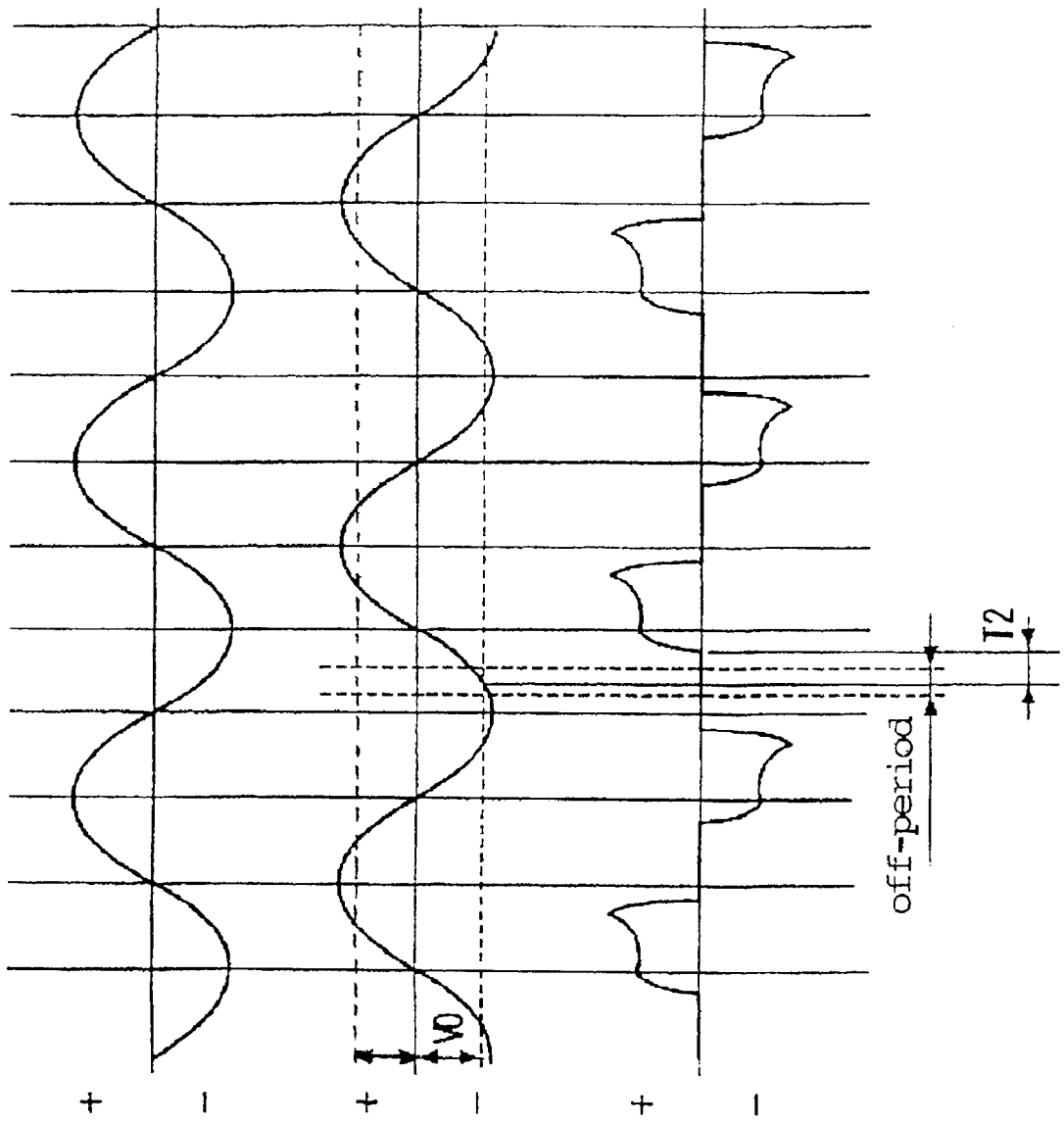
FIG. 6(a) is an exemplary graph showing the position of a movable element when the width of the linear oscillation by the movable element is small according to the third embodiment.
FIG. 6(b) is an exemplary graph showing voltage induced in the coil of an electromagnet relative to FIG. 6(a)
FIG. 6(c) is an exemplary graph showing current supplied to the electromagnet relative to FIG. 6(a)
Figure 7:
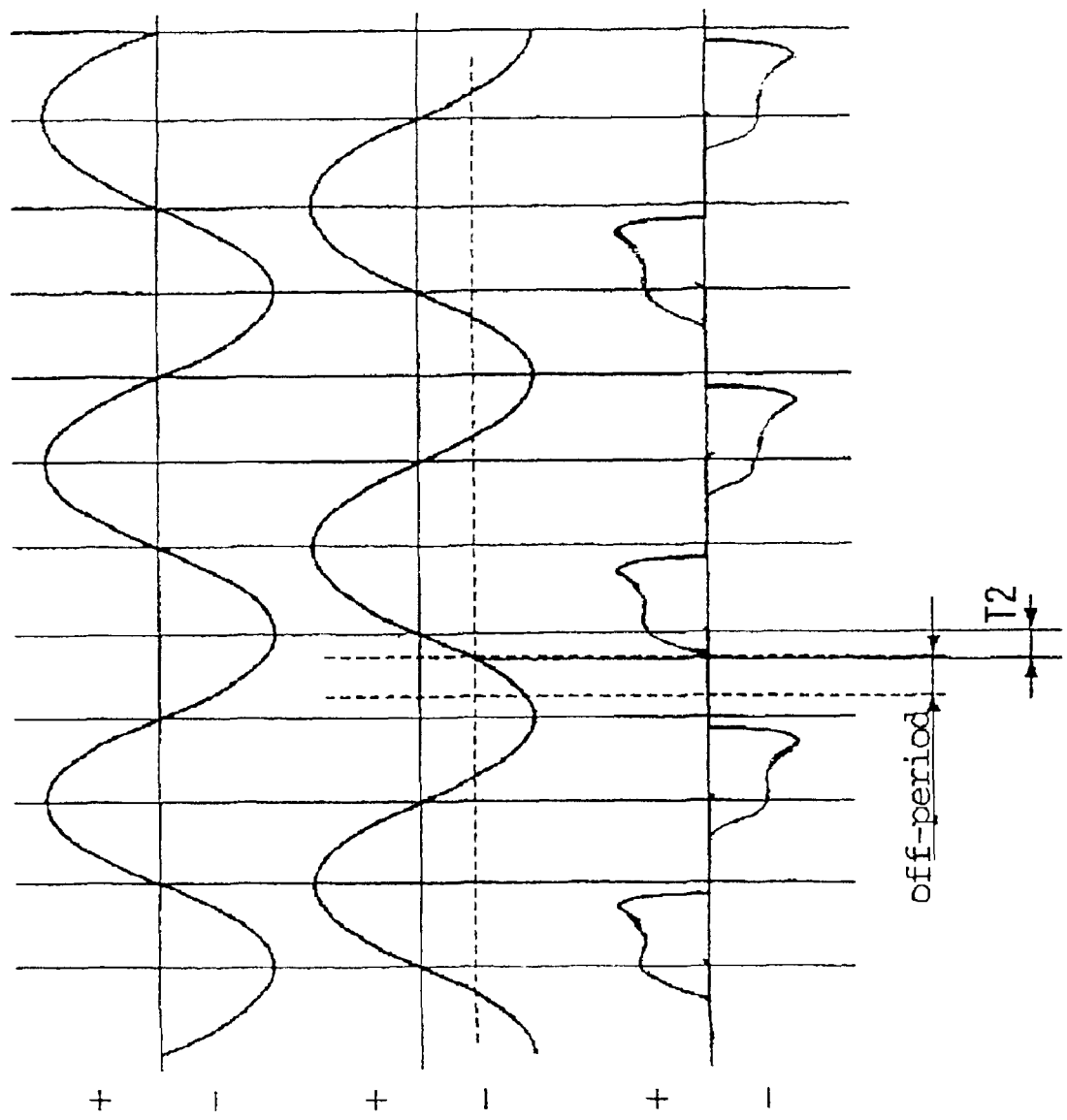
FIG. 7(a) is an exemplary graph showing the position of the movable element when the width of the linear oscillation by the movable element is large according to the third embodiment.
FIG. 7(b) is an exemplary graph showing voltage induced in the coil of the electromagnet relative to FIG. 7(a)
FIG. 7(c) is an exemplary graph showing current supplied to the electromagnet relative to FIG. 7(a)

FIG. 6(a) is an exemplary graph showing the position of the movable element 2, FIG. 6(b) is an exemplary graph showing voltage induced in the coil of the electromagnet 11 relative to FIG. 6(a), and FIG. 6(c) is an exemplary graph showing current supplied to the electromagnet 11 relative to FIG. 6(a), when the width of the linear oscillation by the movable element 2 is small. FIG. 7(a) is an exemplary graph showing the position of the movable element 2, FIG. 7(b) is an exemplary graph showing voltage induced in the coil of the electromagnet 11 relative to FIG. 7(a), FIG. 7(c) is an exemplary graph showing current supplied to the electromagnet 11 relative to FIG. 7(a), when the width of the linear oscillation by the movable element 2 is large.

The points in which the voltage induced in the coil of the electromagnet 11 exceeds the predetermined voltage value (V0) changes depending on the width of the linear oscillation. For example, if the width of the linear oscillation is large, those points become closer to the points where the movable element 2 reverses its direction as shown in FIGS. 7(a) and 7(b). On the other hand, if the width of the linear oscillation is small, those points become farther from the points where the movable element 2 reverses its direction as shown in FIGS. 6(a) and 6(b). Thus, according to the third embodiment, the timing to begin the current supply changes without making any changes to the set period (T2). Accordingly, by appropriately setting the predetermined voltage value (V0) and set period (T2), the points where the movable element 2 reverses its direction and the timing to begin the current supply can be properly adjusted. In order to determine the predetermined voltage value (V0), first, the width of the linear oscillation by the movable element 2 is determined. Then, the wave form of the voltage induced in the coil of the electromagnet 11 is found when the width of the linear oscillation by the movable element 2 is minimum and maximum. The setting period (T1) is determined when the width of the linear oscillation by the movable element 2 is minimum and maximum. The predetermined voltage value (V0) is determined such that the setting period (T1) is set as being determined based on the wave form of the voltage induced in the coil of the electromagnet 11.

Thus, in the third embodiment, the controller 5 supplies current for a short period of time when the width of the linear oscillation is set large, whereas the controller 5 supplies current for a long period of time when the width of the linear oscillation is set small. Additionally, in the third embodiment, rather than detecting the points in which the voltage induced in the winding of the electromagnet 11 exceeds the predetermined voltage value (V0), the detector 71 may be designed to detect points in which the voltage induced in the winding of the electromagnet 11 goes below the predetermined voltage value (V0).

In the first, second and third embodiments, the movable element 2 may be equipped with a permanent magnet while the stator 1 may be equipped with an electromagnet. Also, besides the sensor 6, a magnetic induction device or a photo-sensor may be used. For example, a photo sensor may be provided in the stator 1 while a slit, a light emitting element and a light receiving element may be provided in the movable element 2.

Figure 9:
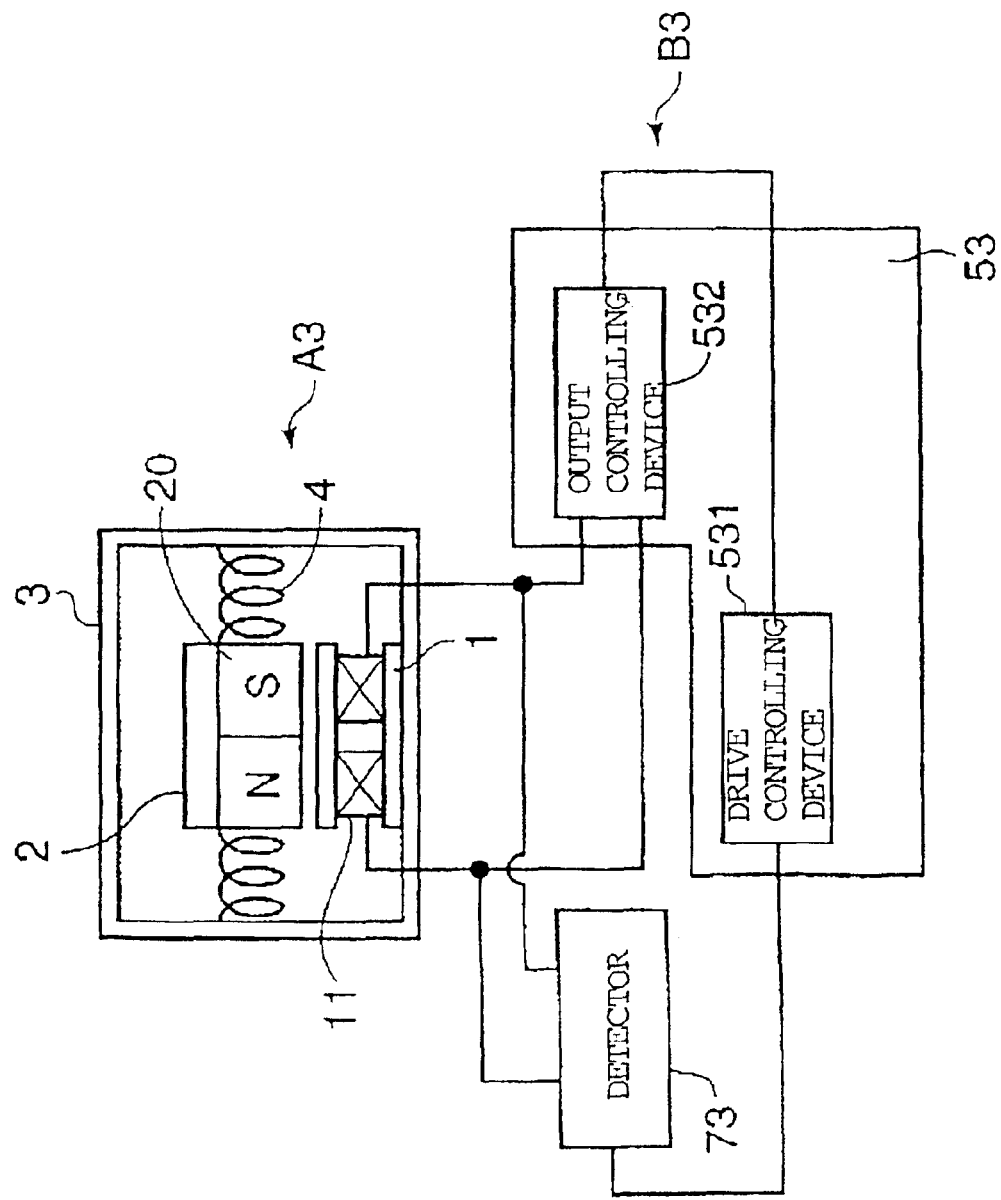
FIG. 9 is an exemplary schematic diagram showing a linear oscillation motor and a controlling device for controlling the linear oscillation motor of the fourth embodiment according to the present invention.

FIG. 9 is an exemplary schematic diagram showing a linear oscillation motor and a controlling device for controlling the linear oscillation motor of the fourth embodiment according to the present invention. In the fourth embodiment, a controller 53 includes a drive controlling device 531 and an output controlling device 532. The drive controlling device 531 controls a timing for supplying current to a winding of an electromagnet 11 provided in the movable element 2. The output controlling device 532 supplies current to the winding of the electromagnet 11 according to commands from the drive controlling device 531.

Figure 10:
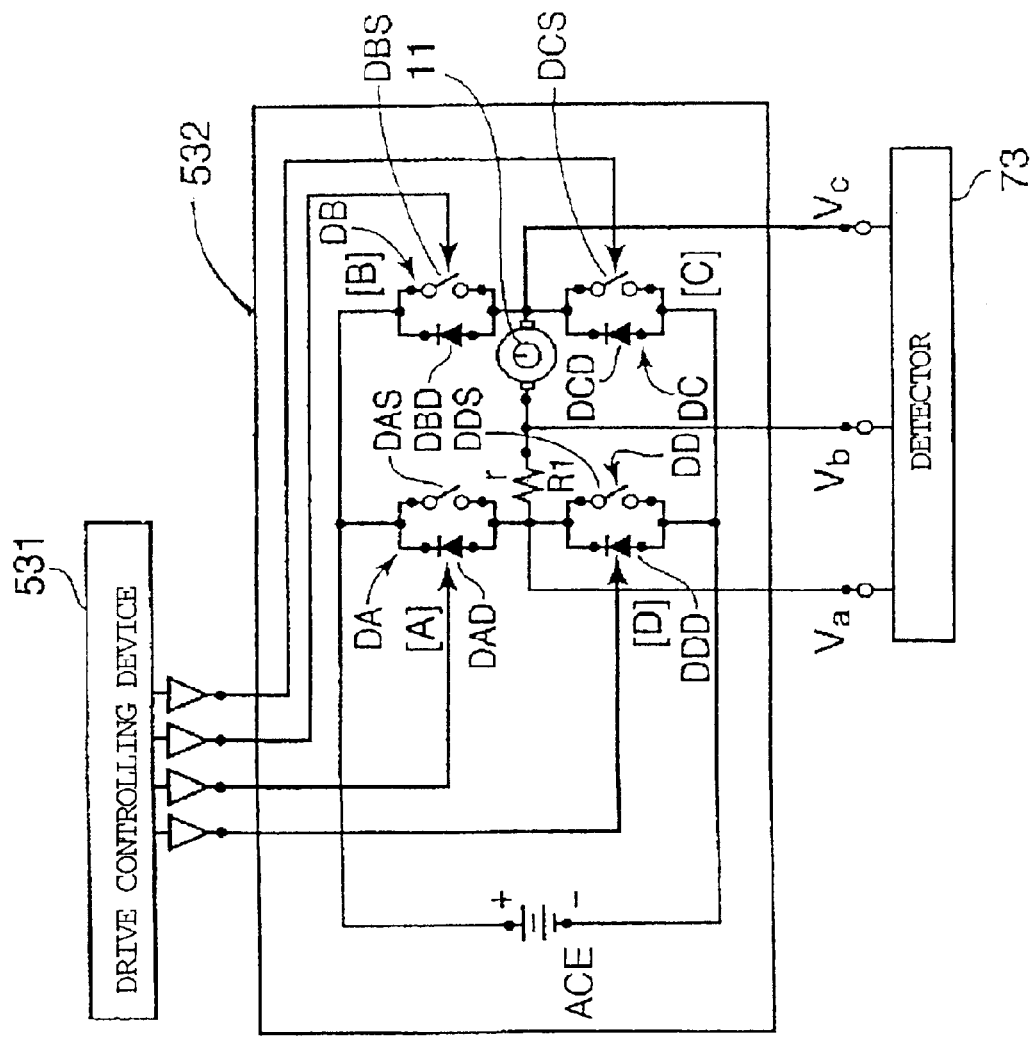
FIG. 10 is an exemplary schematic diagram showing a detector and a controller shown in FIG. 9.

FIG. 10 is an exemplary schematic diagram showing a detector 73 and the controller 53 shown in FIG. 9. The output controlling device 532 includes a probe resistor (R1), a DC source (ACE) and four switching circuits (DA, DB, DC, DD). The probe resistor (R1) is serially connected to the winding of the electromagnet 11 in the stator 1. The DC source (ACE) has a voltage (EB) for supplying current to the winding of the electromagnet 11 in the stator 1. The four switching circuits (DA, DB, DC, DD) includes diodes (DAD, DBD, DCD, DDD) for preventing reverse current and switches (DAS, DBS, DCS, DDS) connected to the diodes (DAD, DBD, DCD, DDD) in parallel, respectively. The diodes (DAD, DBD, DCD, DDD) have the same characteristics and the forward voltage drop (VF).

Referring to FIG. 10, the switching circuit (DA) is connected to the positive end of the DC source (ACE) at one end and the probe resistor (R1) at the other end. The probe resistor (R1) is connected to the winding the electromagnet 11 in the stator 1. The switching circuit (DB) is connected to the positive end of the DC source (ACE) at one end and the winding of the electromagnet 11 in the stator 1. The switching circuit (DC) is connected to the negative end of the DC source (ACE) at one end and the winding of the electromagnet 11 in the stator 1. The switching circuit (DD) is connected to the negative end of the DC source (ACE) at one end and the probe resistor (R1) at the other end.

Figure 11:
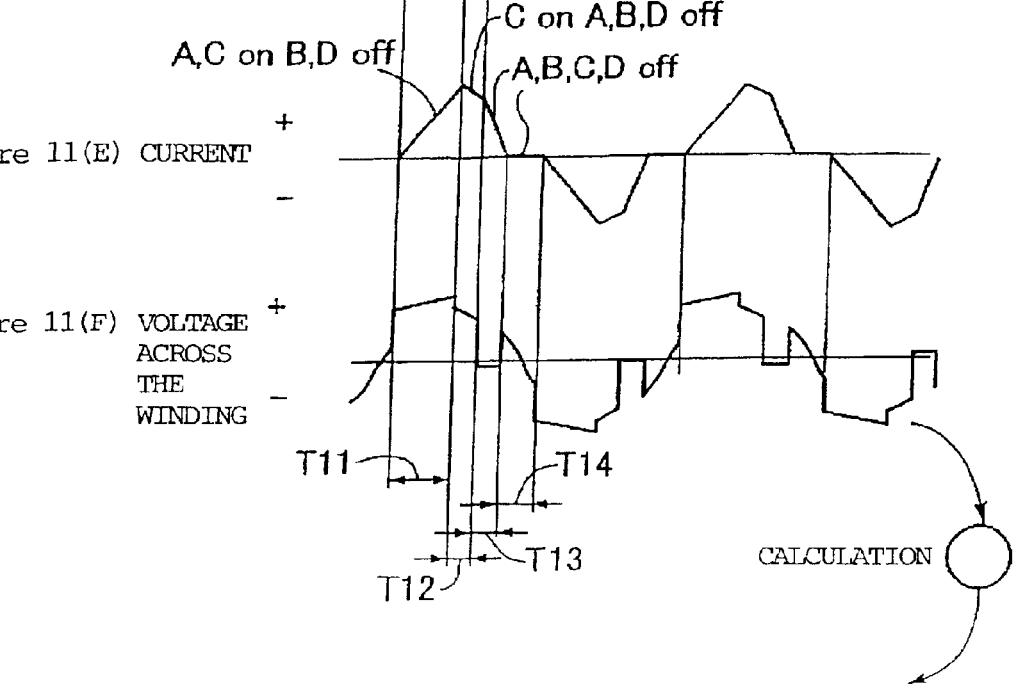
FIG. 11(A) is an exemplary graph showing ON/OFF operation of a switch relative to FIG. 11(I)
FIG. 11(B) is an exemplary graph showing ON/OFF operation of another switch relative to FIG. 11(I)
FIG. 11(C) is an exemplary graph showing ON/OFF operation of another switch relative to FIG. 11(I)
FIG. 11(D) is an exemplary graph showing ON/OFF operation of another switch relative to FIG. 11(I)
FIG. 11(E) is an exemplary graph showing current supplied to the electromagnet relative to FIG. 11(I)
FIG. 11(F) is an exemplary graph showing voltage across the two ends of the coil of the electromagnet relative to FIG. 11(I)
FIG. 11(G) is an exemplary graph showing voltage calculated by a detector relative to FIG. 11(I)
FIG. 11(H) is an exemplary graph showing normalized voltage of the voltage calculated by the detector relative to FIG. 11(I)
FIG. 11(I) is an exemplary graph showing the position of a movable element and voltage induced in the coil of an electromagnet according to the fourth embodiment.

Still referring to FIG. 10, the detector 73 detects an electric potential (Va) at one end of the probe resistor (R1), an electric potential (Vb) at the other end of the probe resistor (R1) between the probe resistor (R1) and the winding of the electromagnet 11, and an electric potential (Vc) at an end of the winding of the electromagnet 11 on the other side of the probe resistor (R1). Then, based on the electric potentials (Va, Vb, Vc), the detector 73 calculates voltage induce in the winding of the electromagnet 11 by the linear oscillation of the movable element 2. The drive controlling device 531 controls ON/OFF operations of the switches (DAS, DBS, DCS, DDS) in the switching circuits (DA, DB, DC, DD). FIG. 11(A) is an exemplary graph showing an ON/OFF operation of the switch (DAS), FIG. 11(B) is an exemplary graph showing an ON/OFF operation of the switch (DBS), FIG. 11(C) is an exemplary graph showing an ON/OFF operation of the switch (DCS), FIG. 11(D) is an exemplary graph showing an ON/OFF operation of the switch (DDS), FIG. 11(E) is an exemplary graph showing current supplied to the electromagnet 11, FIG. 11(F) is an exemplary graph showing voltage across the two ends of the winding of the electromagnet 11, FIG. 11(G) is an exemplary graph showing voltage calculated by the detector 73, and FIG. 11(H) is an exemplary graph showing normalized voltage of the voltage calculated by the detector 73, thereby describing operations of the detector 73 and the controller 53. In FIG. 11(I), the line (O) shows the position of a movable element and the line (G') shows voltage induced in the coil of an electromagnet according to the fourth embodiment.

The drive controlling device 531 controls the ON/OFF operations of the switches (DAS, DBS, DCS, DDS) at the timings shown in FIGS. 11(A), 11(B), 11(C) and 11(D).

Referring to FIG. 11(H), the normalized voltage intersects with a base voltage (V01) at a base timing (T01). The base timing (T01) occurs at a certain phase during the linear oscillation of the movable element regardless of the width of the linear oscillation. Hence, by detecting the base timing (T01) by the detector 73 and supplying current to the winding of the electromagnet 11 at the base timing (T01), the linear oscillation can be carried out with a precise timing.

With the ON/OFF operations of the switches (DAS, DBS, DCS, DDS), current flowing in the winding of the electromagnet 11 changes its value. FIGS. 12, 13, 14 and 15 are exemplary diagrams showing current flows in the circuits of the output controlling device 532. In FIGS. 12, 13, 14 and 15, the winding of the electromagnet 11 is shown as an equivalent circuit (EMC). The equivalent circuit (EMC) includes an equivalent resistor (MR), an equivalent coil (ML) and an equivalent voltage source (MV) connected in series. Current (i) flowing in the winding, i.e., current flowing through the probe resistor (R1), relative to time (t) can be expressed as i(t).

Figure 12:
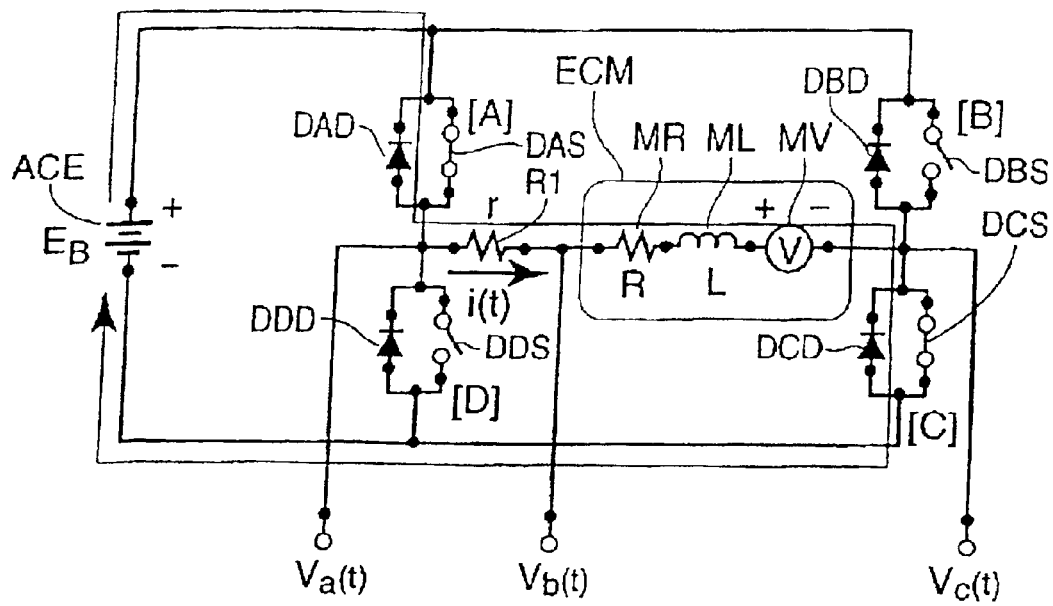
FIG. 12 is an exemplary diagram showing current flows in the circuits of an output controlling device according to the fourth embodiment.
Figure 13:
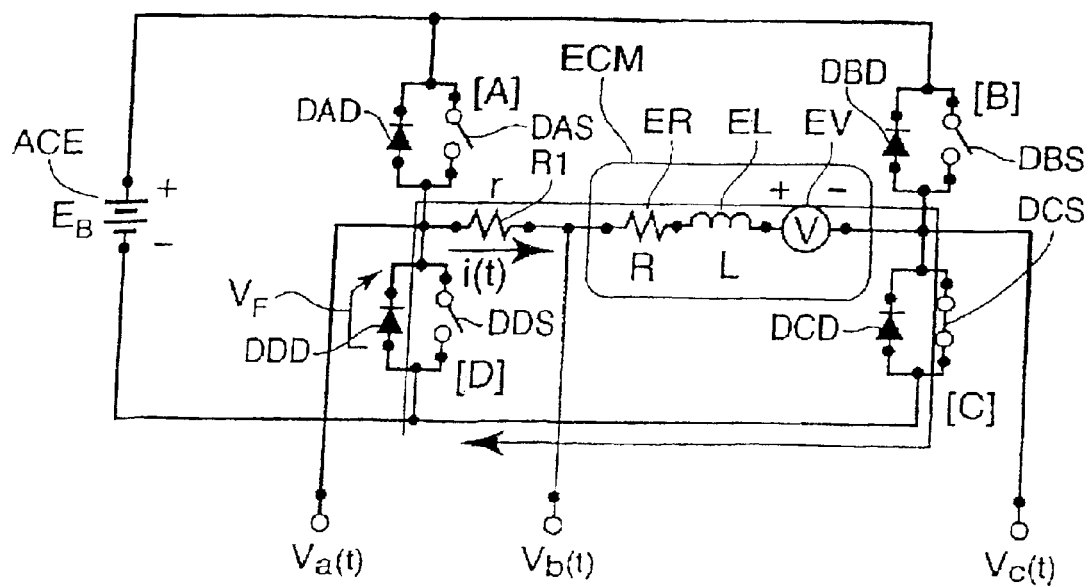
FIG. 13 is another exemplary diagram showing current flows in the circuits of the output controlling device according to the fourth embodiment.
Figure 14:
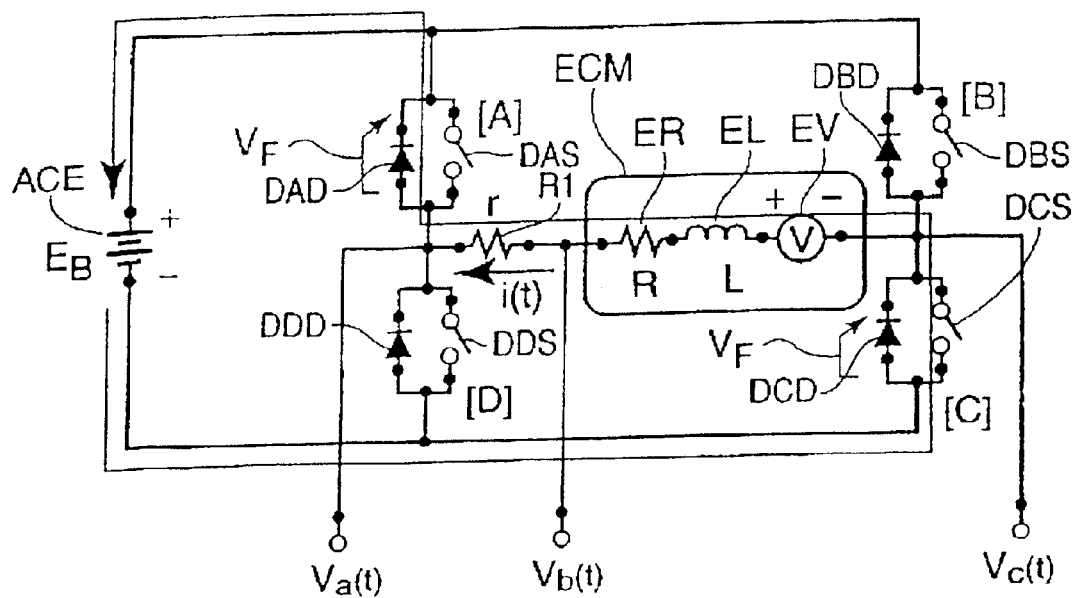
FIG. 14 is yet another exemplary diagram showing current flows in the circuits of the output controlling device according to the fourth embodiment.
Figure 15:
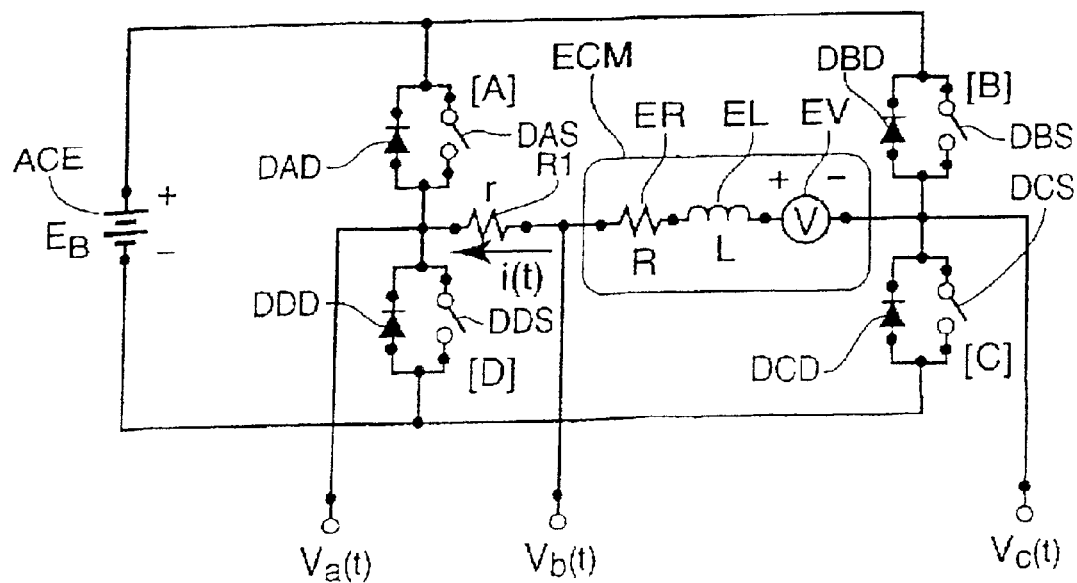
FIG. 15 is still another exemplary diagram showing current flows in the circuits of the output controlling device according to the fourth embodiment.

FIG. 12 is an exemplary diagram showing a current flow in the circuit when the switches (DAS) and (DCS) are ON and the switches (DBS) and (DDS) are OFF, i.e., a period (T11) in FIG. 11(F). FIG. 13 is an exemplary diagram showing a current flow in the circuit when the switch (DCS) is ON and the switches (DAS), (DBS) and (DDS) are OFF, i.e., a period (T12) in FIG. 11(F). FIG. 14 is an exemplary diagram showing a current flow in the circuit when the switches (DAS), (DBS), (DCS) and (DDS) are all OFF, i.e., a period (T13) in FIG. 11(F). FIG. 15 is an exemplary diagram showing no current flow in the circuit when the switches (DAS), (DBS), (DCS) and (DDS) are all OFF, i.e., a period (T14) in FIG. 11(F).

The detector 73 calculates the voltage induced in the winding of the electromagnet 11 by the oscillation of the movable element 2 as follows. As shown in FIG. 12, because the switches (DAS) and (DCS) are ON and the switches (DBS) and (DDS) are OFF, the current, i(t), flows from the DC source (ACE) through the switch (DAS), probe resistor (R1), equivalent circuit (ECM) and switch (DCS) in the circuit. Therefore, following Equations 1-1 and 1-2 can be established.

$$i(t)=(Va(t)-Vb(t))/r \tag{1-1}$$

$$Vb(t)-Vc(t)=L \cdot di(t)/dt+R \cdot i(t)+A \cdot \sin \omega t \tag{1-2}$$

In Equation 1-2, $A \cdot \sin \omega t$ is voltage induced in the winding of the electromagnet 11 by the linear oscillation of the movable element 2. By using Equation 1-1, the current, i(t), in Equation 1-2 can be eliminated and A·sin ωt can be expressed as Equation 2 as follows:

$$A \cdot \sin \omega t = Vb(t) - Vc(t) = L \cdot d\{(Va(t) - Vb(t))/r\}/dt - R \cdot (Va(t) - Vb(t))/r \quad (2)$$

As shown in FIG. 13, because the switch (DCS) is ON and the switches (DAS), (DBS) and (DDS) are OFF, and because some of the electricity accumulated in the equivalent coil (EL) is still remaining, the current, i(t), flows through the diode (DDD), probe resistor (R1), equivalent circuit (ECM) and switch (DCS) in the circuit. Therefore, following Equations 3-1, 3-2 and 3-3 can be established.

$$i(t) = (Va(t) - Vb(t))/r \quad (3\text{-}1)$$

$$Vb(t) - Vc(t) = L \cdot di(t)/dt + R \cdot i(t) + A \cdot \sin \omega t \quad (3\text{-}2)$$

$$Vb(t) - Vc(t) = 1 \cdot V_F + r \cdot i(t) \quad (3\text{-}3)$$

By using Equations 3-1, 3-2 and 3-3, the current, i(t), and the electric potential (Vc) in Equation 3-2 can be eliminated, and A·sin ωt can be expressed as Equation 4 as follows:

$$A \cdot \sin \omega t = V_F + (r-R)(Va(t) - Vb(t))/r - L \cdot d\{(Va(t) - Vb(t))/r\}/dt \quad (4)$$

As shown in FIG. 14, although the switches (DAS), (DBS), (DCS) and (DDS) are all OFF, because some of the electricity accumulated in the equivalent coil (EL) is still remaining, the current, i(t), flows from the DC source (ACE) through the diode (DCD), equivalent circuit (ECM), probe resistor (RI) and diode (DAD) in the direction opposite to that of the voltage (EB) in the circuit. Therefore, following Equations 5-1, 5-2 and 5-3 can be established.

$$i(t) = (Va(t) - Vb(t))/r \quad (5\text{-}1)$$

$$Vb(t) - Vc(t) = L \cdot di(t)/dt - R\ i(t) + A \cdot \sin \omega t \quad (5\text{-}2)$$

$$Vb(t) - Vc(t) = 2 \cdot V_F + r \cdot i(t) - E_B \quad (5\text{-}3)$$

By using Equations 5-1, 5-2 and 5-3, the current, i(t), and electric potential (Vc) in Equation 5-2 can be eliminated, and A·sin ωt can be expressed as Equation 6 as follows:

$$A \cdot \sin \omega t = 2 \cdot V_F + (r-R)(Va(t) - Vb(t))/r - L \cdot d\{(Va(t) - Vb(t))/r\}/dt - E_B \quad (6)$$

As shown in FIG. 15, because the switches (DAS), (DBS), (DCS) and (DDS) are all OFF, no current flows in the circuit. Therefore, following Equations 7-1 and 7-2 can be established.

$$i(t) = 0 \quad (7\text{-}1)$$

$$Vb(t) - Vc(t) = L \cdot di(t)/dt + R \cdot i(t) + A \cdot \sin \omega t \quad (7\text{-}2)$$

By using Equations 7-1 and 7-2, the current, i(t), in Equation 7-2 can be eliminated, and A·sin ωt can be expressed as Equation 8 as follows:

$$A \cdot \sin \omega t = Vb(t) - Vc(t) \quad (8)$$

Based on the current, i(t), flowing in the winding of the electromagnet 11, the detector 73 selectively utilizes Equations (2), (4), (6) and (8), and calculates the voltage induced in the winding of the electromagnet 11 by the linear oscillation of the movable element 2. In other words, the detector 73 calculates the voltage induced in the winding by the linear oscillation of the movable element 2 by subtracting a voltage generated across the winding from voltages generated in the equivalent resistor (MR) and equivalent coil (ML) in the equivalent circuit (ECM).

Also, rather than calculating the voltage induced in the winding of the electromagnet 11 as described above, the detector 73 may utilize a search coil positioned separately from the winding of the electromagnet 11 such that the linear oscillation of the movable element 2 induces voltage in the search coil. In such an example, the detector 73 may use a voltage generated across the search coil, a voltage generated across the probe resistor (R1), a coupling coefficient of the search coil and the winding of the electromagnet 11, and a coupling coefficient of the search coil and the permanent magnet 20 in the movable element 2 in calculating the voltage induced in the winding of the electromagnet 11. Furthermore, by positioning the search coil around the outer circumference of the winding of the electromagnet 11, the coupling coefficient of the search coil and the permanent magnet 20 becomes proportional to the coupling coefficient of the search coil and the winding of the electromagnet 11, thereby simplifying calculation.

Figure 16:
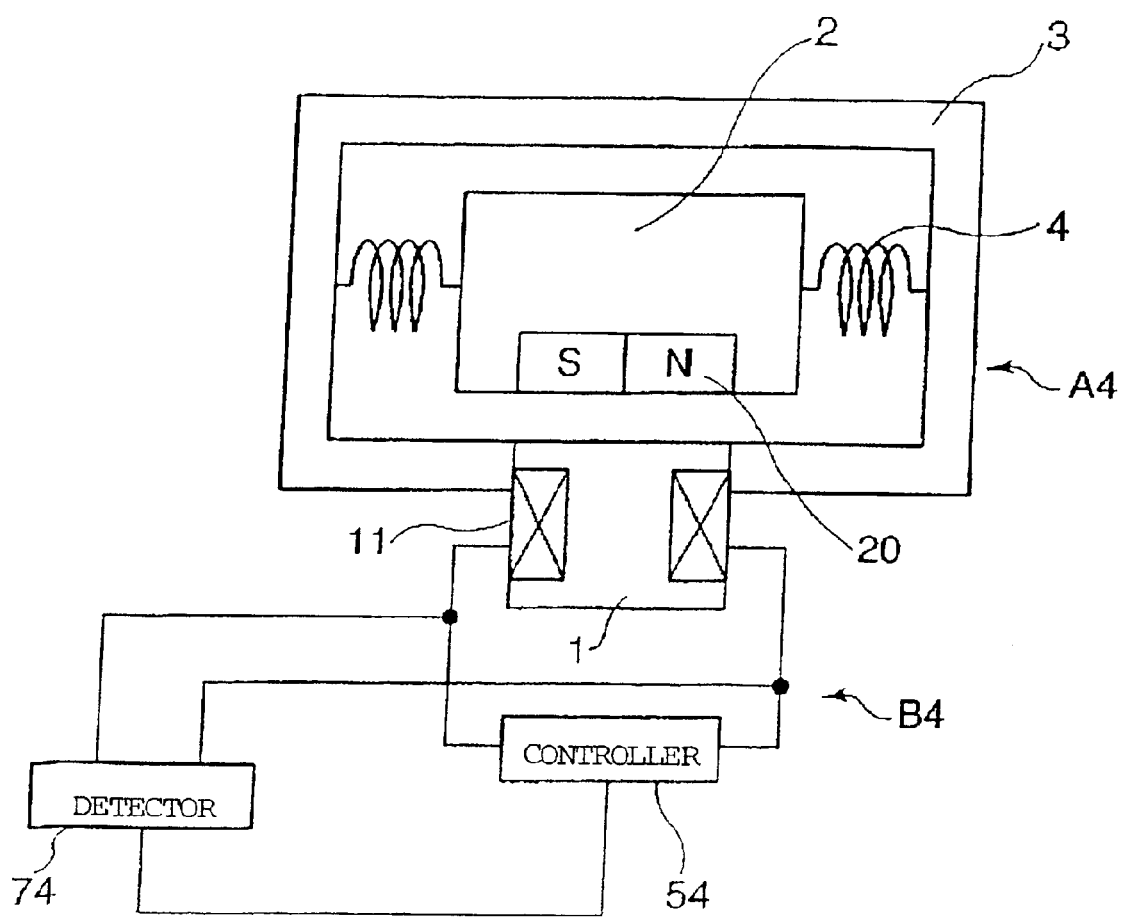
FIG. 16 is an exemplary schematic diagram showing a linear oscillation motor and a controlling device for controlling the linear oscillation motor of the fifth embodiment according to the present invention.

FIG. 16 is an exemplary schematic diagram showing a linear oscillation motor and a controlling device for controlling the linear oscillation motor of the fifth embodiment according to the present invention. In the fifth embodiment, a drive controlling device (B4) includes a detector 74 and a controller 54. The detector 74 detects the width of the linear oscillation by a movable element 2. If the width of the linear oscillation detected by detector 74 is smaller than a first set value, the controller 54 begins current supply to the winding of the electromagnet 11 prior to the point where the movable element 2 reverses its direction. Also, during that time, the controller 54 provides the maximum power possible.

Figure 17:
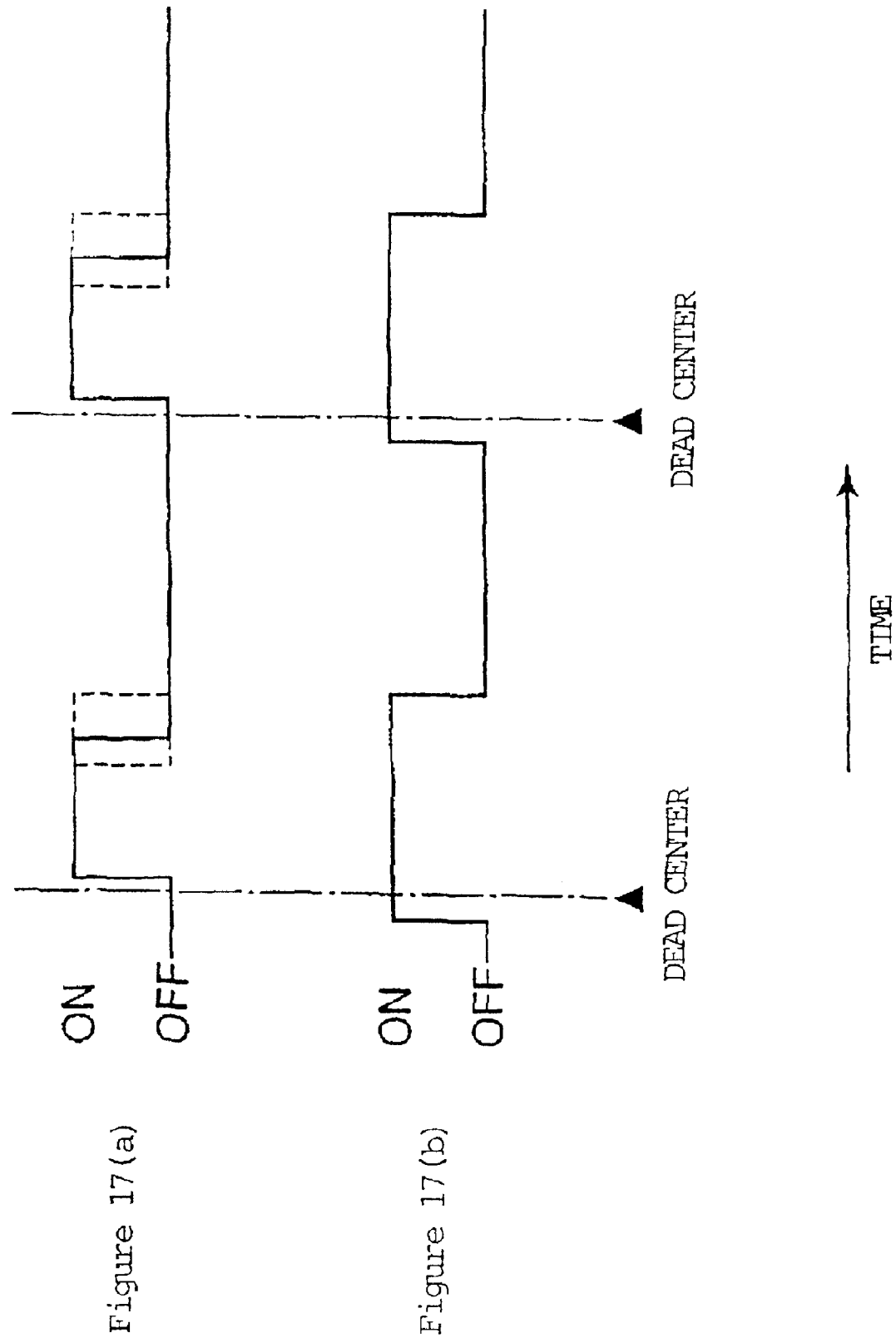
FIG. 17(a) is an exemplary graph showing a timing chart of the controlling device when the width of the linear oscillation by a movable element is larger than a first set value according to the fifth embodiment.
FIG. 17(b) is an exemplary graph showing a timing chart of the controlling device when the width of the linear oscillation by the movable element is smaller than the first set value according to the fifth embodiment.

FIG. 17(a) is an exemplary graph showing a timing chart of the drive controlling device (B4) when the width of the linear oscillation by the movable element 2 is larger than the first set value, and FIG. 17(b) is an exemplary graph showing a timing chart of the drive controlling device (B4) when the width of the linear oscillation by the movable element 2 is smaller than the first set value. As shown in FIG. 17(a), if the width of the linear oscillation by the movable element 2 is larger than the first set value, the controller 54 begins a current supply to the winding of the electromagnet 11 after the movable element 2 reverses its direction. On the contrary, if the width of the oscillation by the movable element 2 is smaller than the first set value, the controller 54 begins a current supply to the winding of the electromagnet 11 before the movable element 2 reverses its direction.

Figure 18:
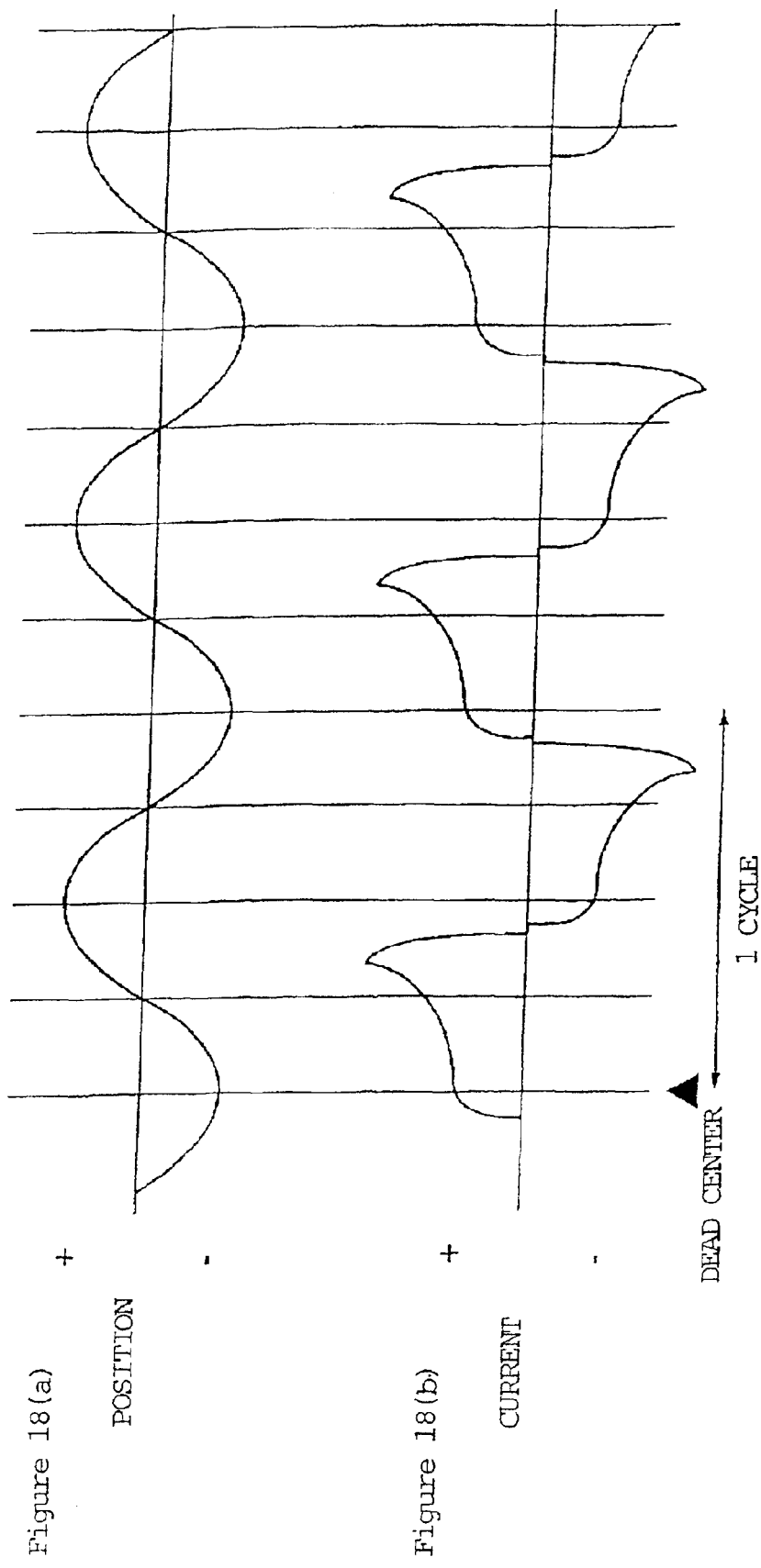
FIG. 18(a) is an exemplary graph showing the position of the movable element when the width of the linear oscillation by the movable element is smaller than the first set value according to the fifth embodiment.
FIG. 18(b) is an exemplary graph showing current supplied to an electromagnet relative to FIG. 18(a)

FIG. 18(a) is an exemplary graph showing the position of the movable element 2, and FIG. 18(b) is an exemplary graph showing current supplied to the electromagnet 11 relative to FIG. 18(a), when the width of the linear oscillation by the movable element 2 is smaller than the first set value according to the fifth embodiment. As shown in FIG. 18(b), the controller 54 begins current supply to the winding of the electromagnet 11 before the movable element 2 reverses its direction. During that time, the controller 54 provides the maximum power possible, i.e., facilitates strong drive, almost without interruption, i.e., almost no off-period.

Figure 19:
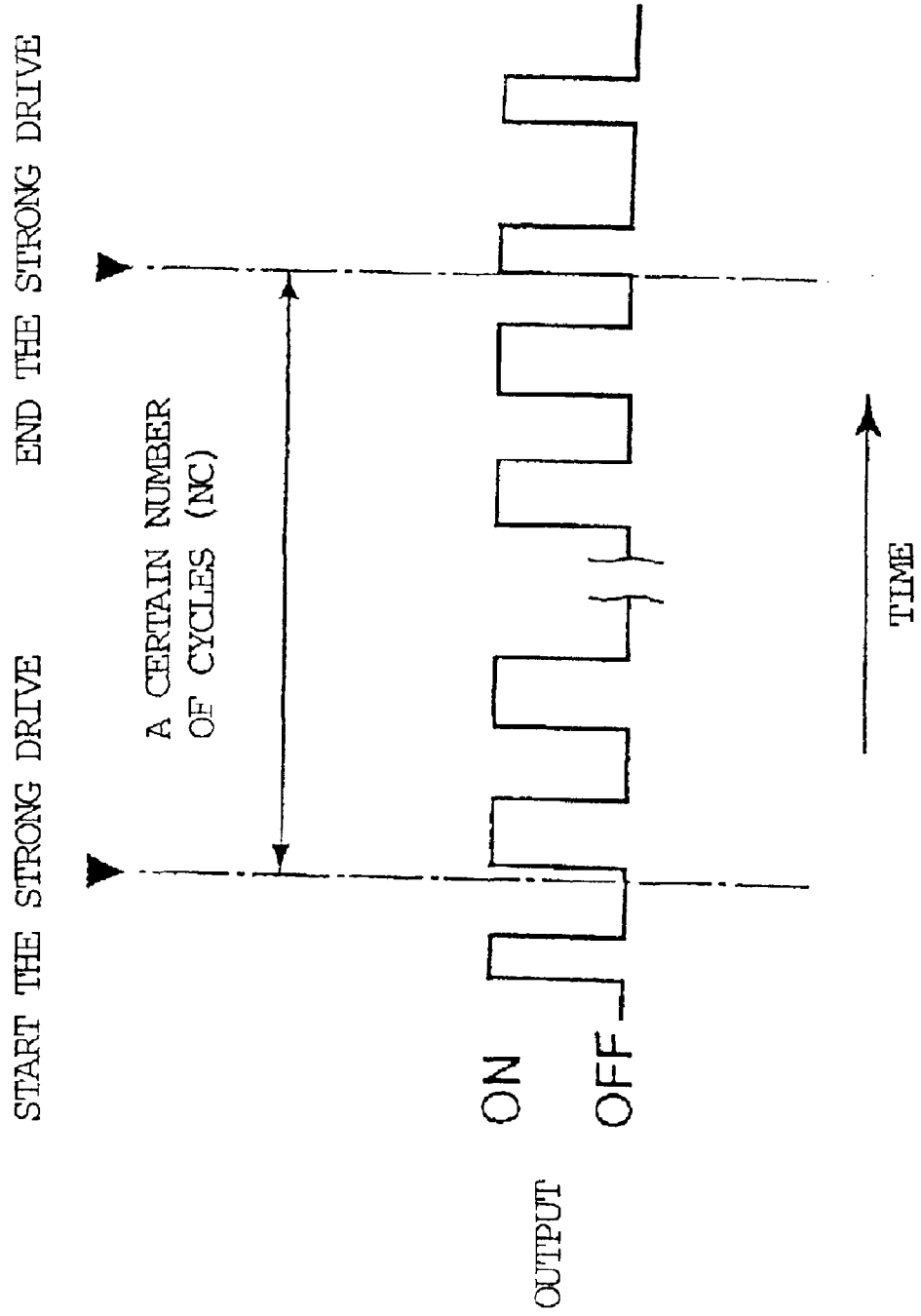
FIG. 19 is an exemplary graph showing another timing chart of the controlling device according to the fifth embodiment.

FIG. 19 is an exemplary graph showing a timing chart of the drive controlling device (B4). As discussed previously, because there are almost no off-period during the strong drive, it becomes difficult for the detector 74 to detect at least one of the position, velocity and acceleration of the movable element 2 during that time. Consequently, as shown in FIG. 19, the controller 54 carries out the strong drive for a certain period of time, for example, a certain number of cycles.

In other words, when the width of the linear oscillation by the movable element 2 is smaller than the first set value, the controller 54 carries out the strong drive, and after a certain number of cycles, the controller 54 restores normal current supply. By limiting the strong drive to a certain duration, despite the detector 74 being temporarily disabled as described above, the width of the linear oscillation is prevented from becoming exceedingly large.

Furthermore, instead of facilitating the strong drive when the width of the linear oscillation by the movable element 2 is smaller than the first set value, the drive controlling device (B4) may include a drive selection device designed to carry out the strong drive by a user's command. Thus, a user can determine when to carry out the strong drive.

Still alternatively, the controller 54 may carry out the strong drive when the width of the linear oscillation by the movable element 2 is smaller than the first set value, and restores the normal current supply when the width of the linear oscillation by the movable element 2 exceeds the first set value. By doing so, the width of the linear oscillation by the movable element 2 can be controlled more precisely within a certain range.

FIGS. 20(*a*) and 20(*b*) are exemplary graphs showing a timing chart of the drive controlling device (B4) which carries out the strong drive based on the width of the linear oscillation by the movable element 2. FIG. 20(*a*) shows a status of drive output and FIG. 20(*b*) is the width of the linear oscillation by the movable element 2. The width of the linear oscillation by the movable element 2 may be detected by the detector 74 as in this embodiment, or alternatively, a device for detecting the width of the linear oscillation may be provided separately from the detector 74. In the latter alternative, the width of the linear oscillation can be continuously detected regardless of the off-period, thereby allowing a more precise control.

Also, in addition to the first set value, a second set value which is smaller than the first set value may be used such that the controller 54 begins a current supply before the movable element 2 reverses its direction and provides the maximum power possible to the winding of the electromagnet 11 when the width of the linear oscillation is smaller than the second set value.

FIGS. 21(*a*)–21(*c*) are exemplary graphs showing timing charts of the drive controlling device (B4) which controls current supply based on the first and second set values. FIG. 21(*a*) shows a status of drive output when the width of the linear oscillation is larger than the first set value, FIG. 21(*b*) shows a status of drive output when the width of the linear oscillation is smaller than the first set value and larger than the second set value, and FIG. 21(*c*) shows a status of drive output when the width of the linear oscillation is smaller than the second set value.

As seen from FIG. 21(*a*), when the width of the oscillation is larger than the first set value, the drive controlling device (B4) carries out normal drive, i.e., the controller 54 begins current supply after the movable element 2 reverses its direction. As seen from FIG. 21(*b*), when the width of the linear oscillation is smaller than the first set value and larger than the second set value, the controller 54 begins current supply before the movable element 2 reverses its direction. As seen from FIG. 21(*c*), when the width of the linear oscillation is smaller than the second set value, the drive controlling device (B4) carries out the strong drive. By controlling current supply as such, the drive controlling device (B4) can control the linear oscillation of the linear oscillation motor more efficiently.

As a further alternative, in addition to the first set value, a second set value which is smaller than the first set value may be used such that the controller 54 begins current supply before the movable element 2 reverses its direction when the width of the linear oscillation is smaller than the first set value and provides an increasingly larger power to the winding of the electromagnet 11 as the width of the linear oscillation becomes increasingly smaller when the width of the linear oscillation is smaller than the second set value. Furthermore, as the power being supplied is changed gradually, the controller 54 may change the point where its current supply begins such that the timing to begin the current supply becomes more efficient.

FIGS. 22(*a*)–22(*e*) are exemplary graphs showing timing charts of the drive controlling device (B4) which increases power supply to the winding of the electromagnet 11 as the width of the linear oscillation becomes increasingly smaller while the width of the linear oscillation is smaller than the second set value. FIG. 22(*a*) shows a status of drive output when the width of the linear oscillation is larger than the first set value, FIG. 22(*b*) shows a status of drive output when the width of the linear oscillation is smaller than the first set value and larger than the second set value, FIG. 22(*c*) shows a status of drive output when the width of the linear oscillation is smaller than the second set value and larger than a third set value, provided that the second set value is larger than the third value, FIG. 22(*d*) shows a status of drive output when the width of the linear oscillation is smaller than the third set value and larger than a fourth set value, provided that the third set value is larger than the fourth value, and FIG. 22(*e*) shows a status of drive output when the width of the linear oscillation is smaller than the fourth set value.

As seen from FIG. 22(*a*), when the width of the linear oscillation is larger than the first set value, the drive controlling device (B4) carries out the normal drive. As seen from FIG. 22(*b*), when the width of the linear oscillation is smaller than the first set value and larger than the second set value, the controller 54 begins current supply before the movable element 2 reverses its direction. As seen from FIGS. 22(*b*), 22(*c*), 22(*d*) and 22(*e*), as the width of the linear oscillation becomes smaller step by step by each set value, the power being supplied becomes larger and larger. Thus, in FIGS. 22(*b*), 22(*c*), 22(*d*) and 22(*e*), powers (P1, P2, P3, P4) have the relationship, P1<P2<P3<P4. Furthermore, FIGS. 22(*b*), 22(*c*), 22(*d*) and 22(*e*) show that as the power being supplied becomes larger and larger, the timing to begin the current supply is being changed to become more efficient.

By providing such a drive controlling device, because the current supply and the timing to begin the current supply are changed more gradually, the linear oscillation motor is operated more smoothly and efficiently.

When the drive controlling device (B4) changes from the normal drive to the strong drive, the resonant frequency of the entire linear oscillation motor (A4) including the controller 54 changes, giving rise to two different resonant frequencies, one during the normal drive and the other during the strong drive. As a result, continuing drive control at a certain frequency may result in a lower driving efficiency. Thus, during the strong drive, the controller 54 may supply a current having a frequency matching a resonant frequency (f+α) of the entire linear oscillating motor (A4) during the strong drive.

Figure 23:
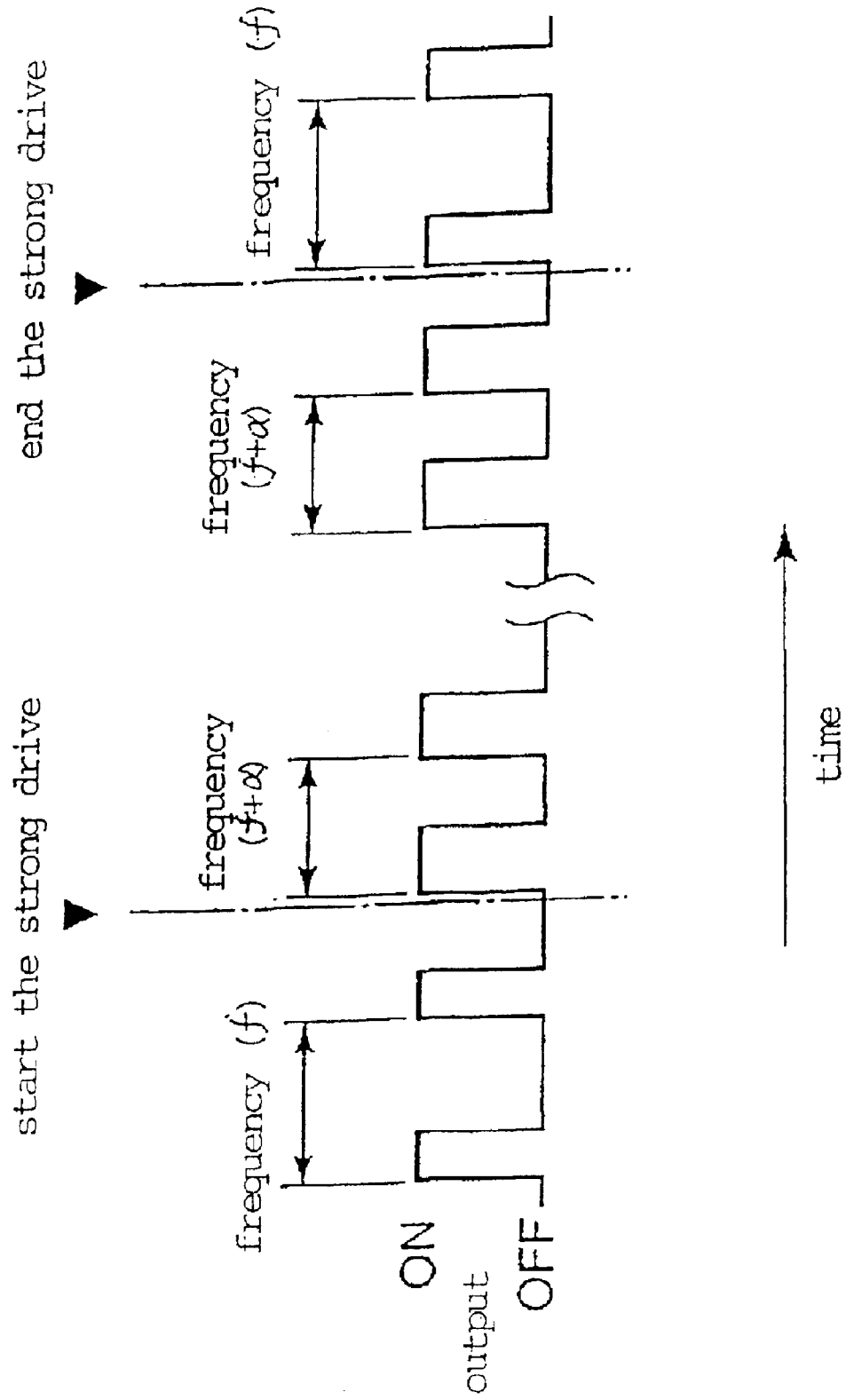
FIG. 23 is an exemplary graph showing a timing chart for changing a frequency of the current being supplied.

FIG. 23 is an exemplary graph showing a timing chart for changing a frequency of the current being supplied. Referring to FIG. 23, during the strong drive, the controller 54 supplies a current having a frequency matching the resonant frequency (f+α) of the entire linear oscillating motor (A4). On the other hand, during the other period, i.e., the normal drive, the controller 54 supplies a current having a frequency matching the resonant frequency (f) of the entire linear oscillating motor (A4) during the normal drive. By doing so, because the current being supplied has a matching frequency to the resonant frequency of the entire linear oscillating motor (A4) regardless of the drive status, the linear oscillation motor is operated more smoothly and efficiently.

Figure 24:
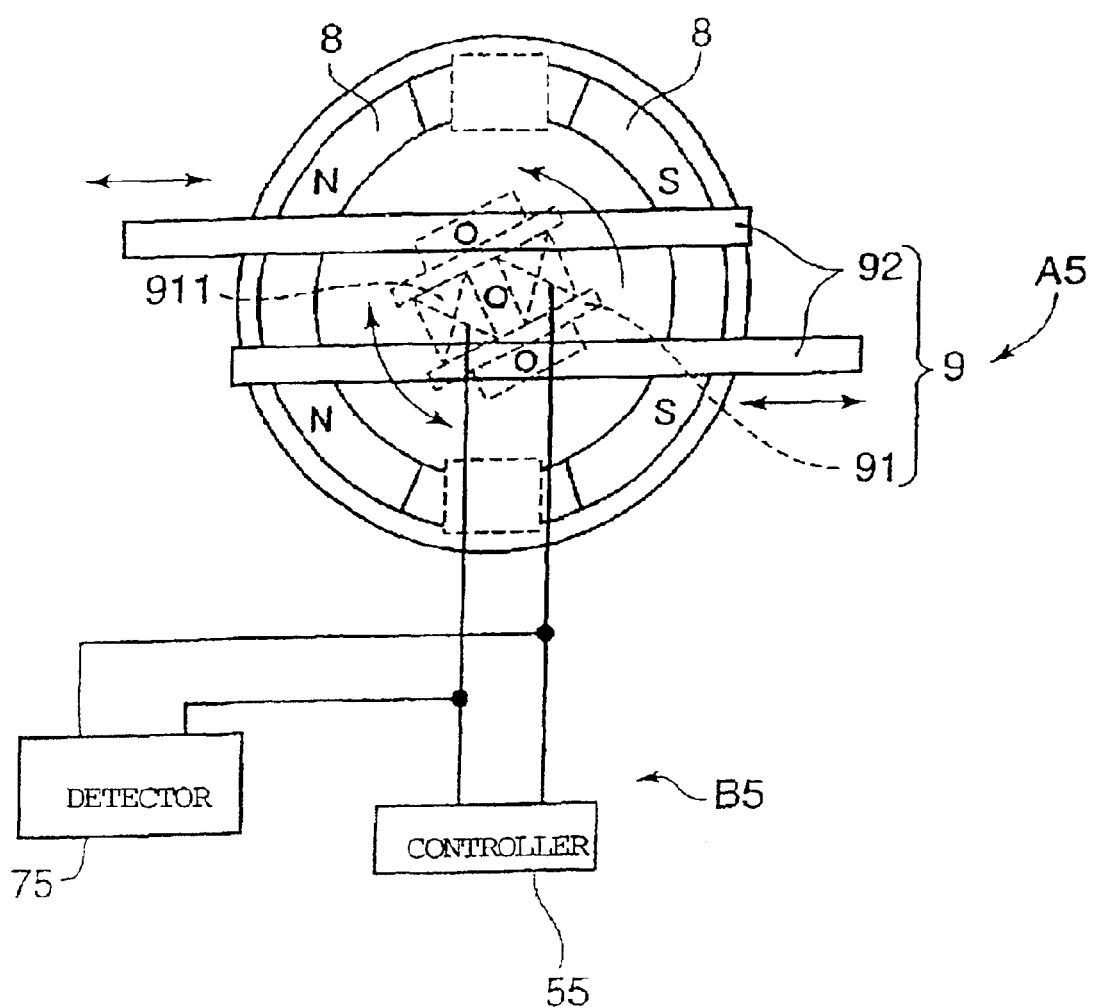
FIG. 24 is an exemplary schematic diagram showing a linear oscillation motor and a drive controlling device of the sixth embodiment according to the present invention.

FIG. 24 is an exemplary schematic diagram showing a linear oscillation motor and a drive controlling device of the sixth embodiment according to the present invention. Referring to FIG. 24, a linear oscillation motor (A5) of the sixth embodiment includes a stator 8, a movable element 9, a rotary body 91 and two oscillatory elements 92. The movable element 9 includes the rotary body 91 which is axially supported and rotated by an alternate magnetic field. The two oscillatory elements 92 are provided separately across the axis of the rotary body 91 and linearly oscillates due to the rotation of the rotary body 91 while moving in opposite directions.

In the sixth embodiment, due to the magnetic force of the stator 8 which is a permanent magnet, the rotary body 91 which is an electromagnet changes its rotational direction within a certain range of a rotational angle in cycle. As a result, the oscillatory elements 92 connected to the rotary body 91 oscillate side by side. Since current is supplied to the rotary body 91 before the oscillatory elements 92 reverse their directions, the current which reaches the rotary body 91 is drastically increased by the time the oscillatory elements 92 reverse their direction, thereby magnetizing the rotary body 91 stronger. As a result, the rotary body 91 is magnetized strongly between the point where the oscillatory elements 92 reverse their directions and the mid-point of their oscillatory movements, and thus, the linear oscillations of the oscillatory elements 92, i.e., mechanical resonance, is carried out at an efficient timing, making the drive control more effective and efficient.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A controlling apparatus for controlling a linear oscillation motor having a movable element and a stator one of which comprises an electromagnet with a winding, the controlling apparatus comprising:
    a sensor configured to detect movement of the movable element, the sensor comprising an inducing device configured to induce voltage according to the movement of the movable element;
    an induced voltage calculator configured to calculate induced voltage in the inducing device according to the movement of the movable element based on voltage of the inducing device, the induced voltage calculator being configured to calculate the induced voltage based on current and the voltage of the inducing device; and
    a controller configured to intermittently supply electric power to the winding of the electromagnet to move the movable element reciprocally and linearly, the controller being configured to begin each intermittent supply of electric power to the winding at a timing before a dead center of the movable element based on an output of the sensor.

2. A controlling apparatus according to claim 1, wherein the controller is configured to begin said each intermittent supply of electric power to the winding at a timing when a predetermined time has elapsed from a reference timing at which a velocity of the movable element detected by the sensor is maximum.

3. A controlling apparatus according to claim 2, wherein the sensor comprises the winding of the electromagnet, and the controller is configured to prohibit supply of electric power to the winding during a period including the reference timing.

4. A controlling apparatus according to claim 1, wherein the controller is configured to begin said each intermittent supply of electric power to the winding at a timing when a predetermined time has elapsed from a reference timing at which an absolute value of induced voltage in the winding of the electromagnet increases or decreases to be equal to a predetermined reference absolute value.

5. A controlling apparatus according to claim 4, wherein the sensor comprises the winding of the electromagnet, and the controller is configured to prohibit supply of electric power to the winding during a predetermined period.

6. A controlling apparatus according to claim 1, wherein the sensor comprises a magnetic induction device.

7. A controlling apparatus according to claim 1, wherein the sensor comprises a photo-sensor.

8. A controlling apparatus according to claim 1, wherein the sensor is configured to detect position, velocity and/or acceleration of the movable element.

9. A controlling apparatus according to claim 1, wherein the controller comprises,
    an output controlling device configured to control current supplied to the winding of the electromagnet, and
    a drive control device configured to control the output controlling device to control a timing of current supply control.

10. A controlling apparatus according to claim 9,
    wherein the sensor comprises an inducing device which is configured to induce voltage according to the movement of the movable element, and
    wherein the controlling apparatus further comprises an induced voltage calculator configured to calculate induced voltage in the inducing device according to the movement of the movable element based on voltage of the inducing device, the induced voltage calculator having a plurality of equations which is used to calculate the induced voltage depending on a status of the current supply control.

11. A controlling apparatus according to claim 9, further comprising:
    an induced voltage calculator configured to calculate induced voltage in the inducing device according to the movement of the movable element based on voltage of the inducing device;
    a voltage normalizing device configured to normalize the induced voltage calculated by the induced voltage calculator; and
    a reference timing generator configured to generate a reference timing at which normalized voltage normalized by the voltage normalizing device is equal to a predetermined voltage.

12. A controlling apparatus according to claim 1, wherein the inducing device comprises the winding of the electromagnet.

13. A controlling apparatus according to claim 1, further comprising an amplitude detector configured to detect an amplitude of oscillation of the movable element based on the output of the sensor, wherein the controller is configured to begin each intermittent supply of electric power to the winding at a timing before a dead center of the movable element when the amplitude of the oscillation of the movable element is less than a predetermined first amplitude.

14. A controlling apparatus according to claim 13, wherein the controller is configured to begin each intermittent supply of electric power to the winding at a timing before a dead center of the movable element during a predetermined period.

15. A controlling apparatus according to claim 1, further comprising a driving selector through which a driving condition of the movable element is selected, wherein the controller is configured to begin each intermittent supply of electric power to the winding at a timing before a dead center of the movable element when a strong driving condition is selected via the driving selector.

16. A controlling apparatus according to claim 13, wherein the controller is configured to supply maximum electric power to the winding when the amplitude of the oscillation of the movable element is less than a predetermined second amplitude which is smaller than the predetermined first amplitude.

17. A controlling apparatus according to claim 13, wherein the controller is configured to change the supply of electric power to the winding according to the amplitude of the oscillation of the movable element.

18. A controlling apparatus according to claim 13, wherein the controller is configured to increase a frequency of the electric power supplied to the winding and to begin each intermittent supply of electric power to the winding at a timing before a dead center of the movable element when the amplitude of the oscillation of the movable element is less than a predetermined first amplitude.

19. A controlling apparatus according to claim 1, wherein the controller is configured to intermittently supply electric power to the winding of the electromagnet to provide the movable element with force in only one direction.

20. A linear oscillation motor comprising:

a movable element;

a stator, one of the movable element and the stator comprising an electromagnet with a winding;

a sensor configured to detect movement of the movable element, the sensor comprising an inducing device configured to induce voltage according to the movement of the movable element;

an induced voltage calculator configured to calculate in induced voltage in the inducing device according to the movement of the movable element based on voltage of the inducing device, the induced voltage calculator being configured to calculate the induced voltage based on current and the voltage of the inducing device; and a controller configured to intermittently supply electric power to the winding of the electromagnet to move the movable element reciprocally and linearly, the controller being configured to begin each intermittent supply of electric power to the winding at a timing before a dead center of the movable element based on an output of the sensor.

21. A linear oscillation motor comprising:

a rotor;

a stator, one of the rotor and the stator comprising an electromagnet with a winding;

a sensor configured to detect movement of the movable element;

a controller configured to intermittently supply electric power to the winding of the electromagnet to rotate the rotor periodically changing a rotational direction of the rotor, the controller being configured to begin each intermittent supply of electric power to the winding at a timing before a dead center at which the rotor changes its rotational direction; and an oscillatory element configured to be moved reciprocally and linearly by rotation of the rotor.

22. A method for controlling a linear oscillation motor having a movable element and a stator one of which comprises an electromagnet with a winding, the method comprising:

providing an inducing device which is configured to induce voltage according to movement of the movable element;

calculating the induced voltage in the inducing device based on current and the voltage of the inducing device;

supplying electric power intermittently to the winding of the electromagnet to move the movable element reciprocally and linearly; and beginning each intermittent supply of electric power to the winding at a timing before a dead center of the movable element based on the calculated induced voltage.

23. A controlling apparatus for controlling a linear oscillation motor having a movable element and a stator one of which comprises an electromagnet with a winding, the controlling apparatus comprising:

sensor means for detecting movement of the movable element, the sensor means comprising inducing means for inducing voltage according to the movement of the movable element;

induced voltage calculation means for calculating induced voltage in the inducing means according to the movement of the movable element based on voltage of the inducing means, the induced voltage calculation means being confined to calculate the induced voltage based on current and the voltage of the inducing means; and controlling means for intermittently supplying electric power to the winding of the electromagnet to move the movable element reciprocally and linearly, the controlling means beginning each intermittent supply of electric power to the winding at a timing before a dead center of the movable element based on an output of the sensor means.

24. A linear oscillation motor comprising:

a movable element;

a stator, one of the movable element and the stator comprising an electromagnet with a winding;

sensor means for detecting movement of the movable element, the sensor means comprising inducing means for inducing voltage according to the movement of the movable element;

induced voltage calculation means for calculating induced voltage in the inducing means according to the movement of the movable element based on voltage of the inducing means, the induced voltage calculation means being confined to calculate the induced voltage based on current and the voltage of the inducing means; and controlling means for intermittently supplying electric power to the winding of the electromagnet to move the movable element reciprocally and linearly, the controlling means beginning each intermittent supply of electric power to the winding at a timing before a dead center of the movable element based on an output of the sensor means.

25. A linear oscillation motor comprising:

a rotor;

a stator, one of the rotor and the stator comprising an electromagnet with a winding;

sensor means for detecting movement of the rotor;

controlling means for intermittently supplying electric power to the winding of the electromagnet to rotate the rotor periodically changing a rotational direction of the rotor, the controller being configured to begin each intermittent supply of electric power to the winding at a timing before a dead center at which the rotor changes its rotational direction; and oscillatory means for being moved reciprocally and linearly by rotation of the rotor.

* * * * *

UNITED STATES PATENT AND TRADEMARK OFFICE
CERTIFICATE OF CORRECTION

PATENT NO. : 6,774,588 B2
DATED : August 10, 2004
INVENTOR(S) : Yasuo Ibuki et al.

It is certified that error appears in the above-identified patent and that said Letters Patent is hereby corrected as shown below:

Column 11,
Line 5, please change "$Vb(t)/r$" to -- $Vb(t))/r$ --.

Column 18,
Line 59, please change "confined" to -- configured --.

Signed and Sealed this

Fourth Day of January, 2005

JON W. DUDAS
*Director of the United States Patent and Trademark Office*